(12) United States Patent
Iwafuchi

(10) Patent No.: US 11,792,349 B1
(45) Date of Patent: Oct. 17, 2023

(54) INFORMATION PROCESSING APPARATUS, IMAGE FORMING APPARATUS, AND IMAGE FORMING SYSTEM

(71) Applicant: FUJIFILM Business Innovation Corp., Tokyo (JP)

(72) Inventor: Toshihiro Iwafuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/869,760

(22) Filed: Jul. 20, 2022

(30) Foreign Application Priority Data

Mar. 25, 2022 (JP) ................. 2022-050682

(51) Int. Cl.
*H04N 1/60* (2006.01)
*H04N 1/50* (2006.01)
*G06F 3/12* (2006.01)

(52) U.S. Cl.
CPC ......... *H04N 1/6038* (2013.01); *G06F 3/1208* (2013.01); *H04N 1/502* (2013.01); *H04N 1/6036* (2013.01)

(58) Field of Classification Search
CPC ..... H04N 1/6038; H04N 1/502; H04N 1/6036
See application file for complete search history.

(56) References Cited

U.S. PATENT DOCUMENTS

| | | | | |
|---|---|---|---|---|
| 5,734,800 A * | 3/1998 | Herbert | | H04N 1/54 358/1.9 |
| 6,027,201 A * | 2/2000 | Edge | | H04N 1/6036 347/172 |
| 8,013,868 B2 * | 9/2011 | Sasaki | | H04N 1/6058 345/589 |
| 2005/0018024 A1 * | 1/2005 | Sommer | | B41J 2/21 347/100 |
| 2005/0179727 A1 * | 8/2005 | Bestmann | | H04N 1/54 347/43 |
| 2007/0165252 A1 * | 7/2007 | Sasaki | | H04N 1/54 358/1.9 |
| 2013/0003091 A1 * | 1/2013 | Matsuzaki | | H04N 1/6033 358/1.9 |
| 2017/0201653 A1 * | 7/2017 | Kyan | | H04N 1/6063 |
| 2022/0070335 A1 * | 3/2022 | Matsushima | | H04N 1/6022 |
| 2022/0256057 A1 * | 8/2022 | Kawai | | H04N 1/54 |

FOREIGN PATENT DOCUMENTS

| | | | | |
|---|---|---|---|---|
| JP | 2000165692 A | * | 6/2000 | ........... G06T 11/001 |
| JP | 2007194745 | | 8/2007 | |
| JP | 2011010083 | | 1/2011 | |
| JP | 2011010083 A | * | 1/2011 | |

* cited by examiner

*Primary Examiner* — Ted W Barnes
(74) *Attorney, Agent, or Firm* — JCIPRNET

(57) ABSTRACT

An information processing apparatus includes a processor configured to, in a case where a first color material, a second color material, a third color material, and a fourth color material in which a difference between the first color material and the fourth color material in a color space is less than a threshold value, are capable of being used, output combinations of values of color materials reproducing a first color, which is used for expanding a color gamut of a secondary color of the first color material and the second color material, and a second color, which is used for expanding a color gamut of a secondary color of the first color material and the third color material.

15 Claims, 22 Drawing Sheets

| SECONDARY COLOR HAVING COLOR CLOSE TO SPOT COLOR | COLOR GAMUT TO BE EXPANDED |
|---|---|
| O(Y=100, M=100) | EXPAND O (ORANGE) AREA |
| G(Y=100, C=100) | EXPAND G (GREEN) AREA |
| V(C=100, M=100) | EXPAND V (VIOLET) AREA |

| COLOR OF COLOR MATERIAL HAVING COLOR CLOSE TO SPOT COLOR | COLOR GAMUT TO BE EXPANDED |
|---|---|
| M | EXPAND O (ORANGE) AREA AND V (VIOLET) AREA |
| Y | EXPAND O (ORANGE) AREA AND G (GREEN) AREA |
| C | EXPAND G (GREEN) AREA AND V (VIOLET) AREA |

COLOR CHART OF CMKP
(COMBINATION OF P
AND CMK EXCLUDING Y,
WHICH IS COMPLEMENTARY COLOR
OF COLOR GAMUT V)

COLOR CHART OF MYKP
(COMBINATION OF P
AND MYK EXCLUDING C,
WHICH IS COMPLEMENTARY COLOR
OF COLOR GAMUT O)

COLOR CHART OF CMYK

FIG. 13

| SPOT COLOR | BASIC PATTERN DATA | EXPANSION PATTERN DATA WHERE C IS REPLACED WITH SPOT COLOR | EXPANSION PATTERN DATA WHERE M IS REPLACED WITH SPOT COLOR | EXPANSION PATTERN DATA WHERE Y IS REPLACED WITH SPOT COLOR |
|---|---|---|---|---|
| NONE | CMYK | | | |
| O | CMYK | MYK + O | | |
| G | CMYK | | CYK + G | |
| V | CMYK | | | CMK + V |
| FLUORESCENCE P | CMYK | MYK + FLUORESCENCE P | | CMK + FLUORESCENCE P |
| FLUORESCENCE Y | CMYK | MYK + FLUORESCENCE Y | CYK + FLUORESCENCE Y | |
| FLUORESCENCE C | CMYK | | CYK + FLUORESCENCE C | CMK + FLUORESCENCE C |

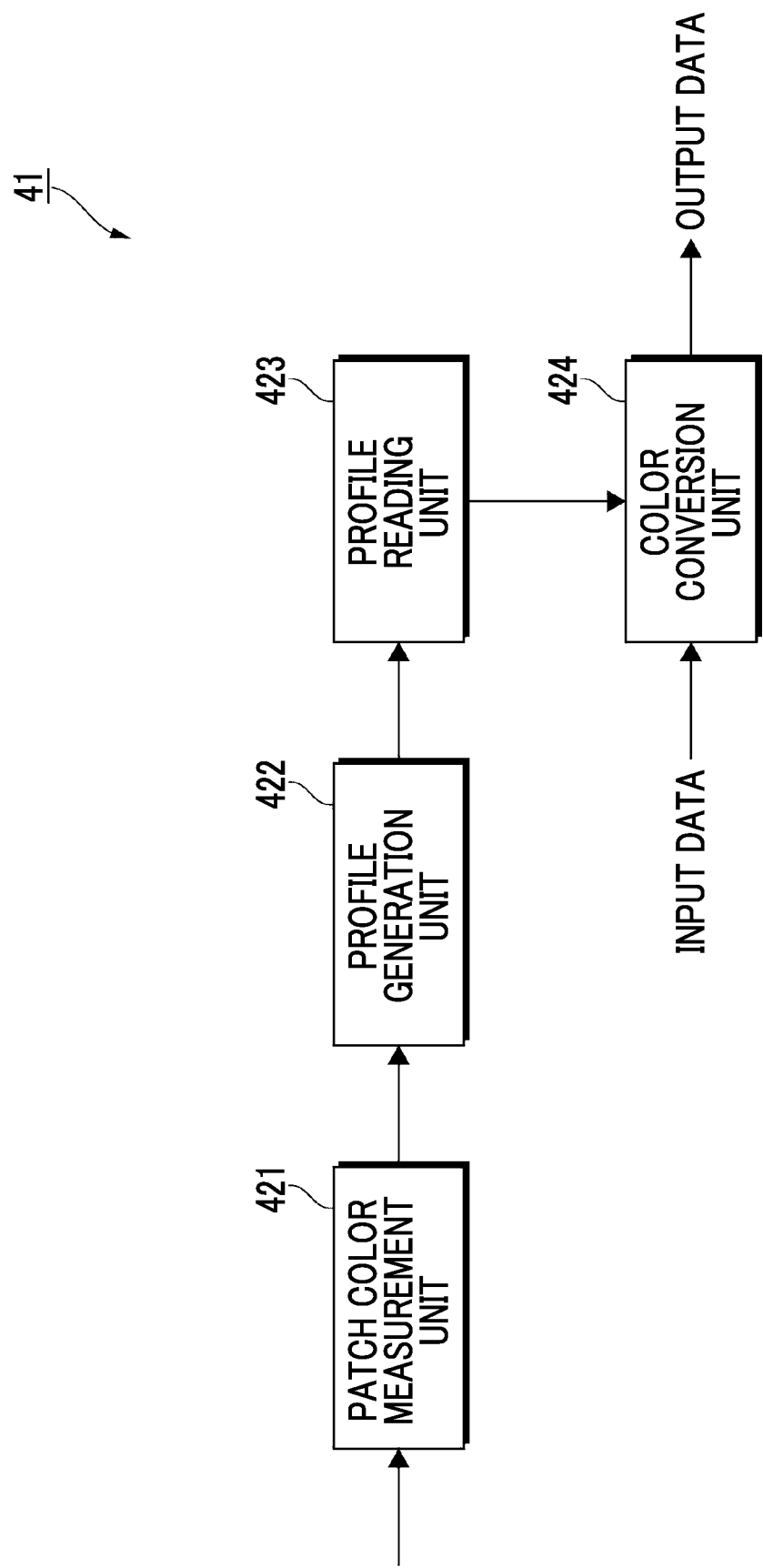

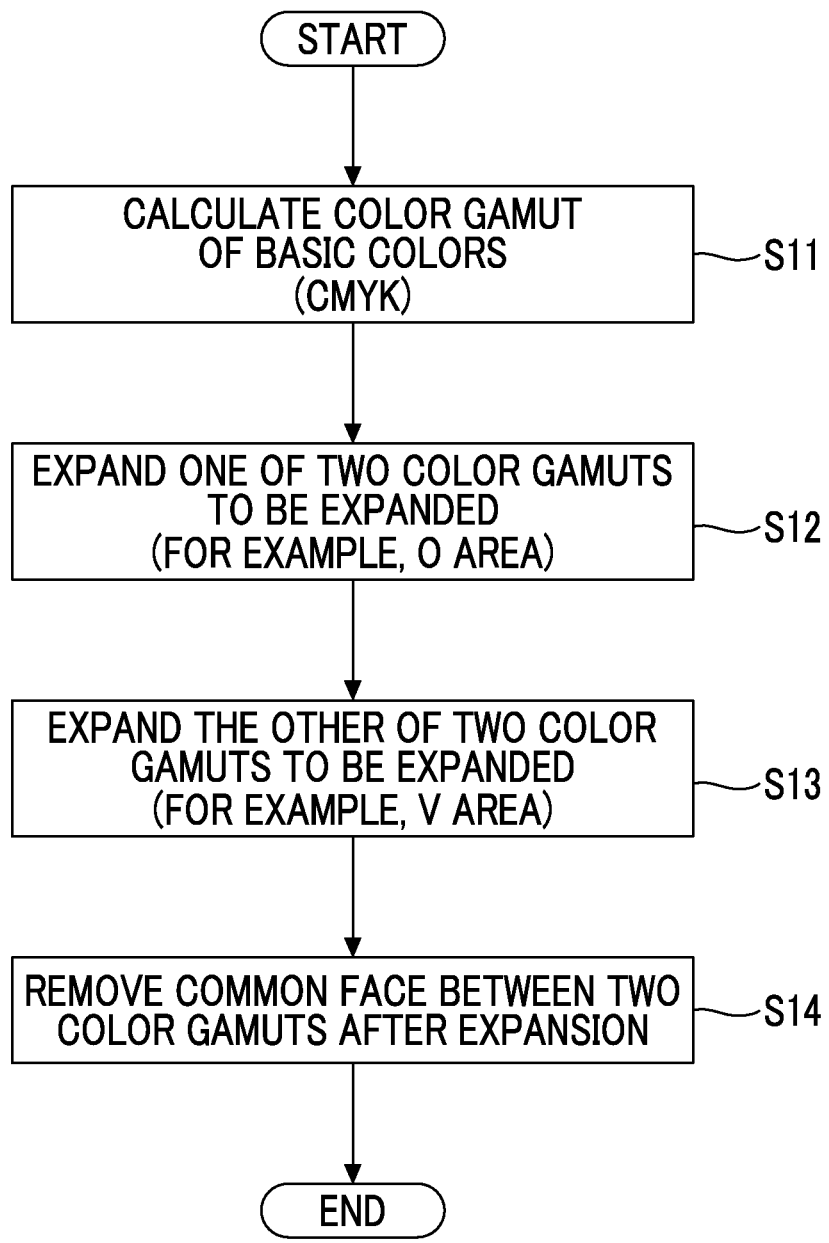

INFORMATION PROCESSING APPARATUS, IMAGE FORMING APPARATUS, AND IMAGE FORMING SYSTEM

CROSS-REFERENCE TO RELATED APPLICATIONS

This application is based on and claims priority under 35 USC 119 from Japanese Patent Application No. 2022-050682 filed Mar. 25, 2022.

BACKGROUND

(i) Technical Field

The present invention relates to an information processing apparatus, an image forming apparatus, and an image forming system.

(ii) Related Art

In color printing, four colors of C (cyan), M (magenta), Y (yellow), and K (black) are defined as basic colors.

Today, for the purpose of expanding a color gamut, colors other than the four colors (hereinafter, also referred to as "spot colors") may be used. The spot colors include, for example, O (orange), G (green), R (red), V (violet), and B (blue). Recently, as a spot color, P (fluorescent pink) and other fluorescent colors are also used. By mixing the fluorescent color with a color material, more vivid colors than the basic colors can be reproduced. That is, the color gamut is expanded.

SUMMARY

A color space including the color gamut that can be represented by the three colors of C, M, and Y is divided into three areas corresponding to secondary colors.

The secondary colors are colors represented by a mixture of two colors of C, M, and Y. For example, an area corresponding to the secondary color of Y and M is called an O area, an area corresponding to the secondary color of C and M is called a V area, and an area corresponding to the secondary color of C and Y is called a G area.

The P described above belongs to the O area in the color space. In the case of JP2011-10083A, P is used to expand the O area.

By the way, P is a color close to M positioned at a boundary between the O area and the V area. Therefore, P can also be used to expand the V area. However, until now, P has been used only for the expansion of either the O area or the V area. In other words, the technique of simultaneously expanding both the O area and the V area by P has not been established.

Aspects of non-limiting embodiments of the present disclosure relate to an information processing apparatus, an image forming apparatus, and an image forming system that expands a color gamut reproduced by an image forming apparatus as compared with a case where only one of the secondary color areas is expanded with one color material.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where a first color material, a second color material, a third color material, and a fourth color material in which a difference between the first color material and the fourth color material in a color space is less than a threshold value, are capable of being used, output combinations of values of color materials reproducing a first color, which is used for expanding a color gamut of a secondary color of the first color material and the second color material, and a second color, which is used for expanding a color gamut of a secondary color of the first color material and the third color material.

BRIEF DESCRIPTION OF THE DRAWINGS

Exemplary embodiment(s) of the present invention will be described in detail based on the following figures, wherein:

FIG. 4A shows an example of the entire configuration, and FIG. 4B shows an example of an internal configuration of a patch data generation unit;

FIG. 12A is a color chart of the color gamut reproduced by CMYK, FIG. 12B is a color chart of the color gamut reproduced by MYKP, and FIG. 12C is a color chart of the color gamut reproduced by CMKP;

FIG. 13 is a diagram summarizing a relationship between pattern data generated by a patch data generation unit and the spot color;

FIG. 14 is a diagram illustrating an example of a functional configuration related to the generation of a profile for color conversion implemented by the processor;

FIG. 16 is a flowchart illustrating an example of a processing procedure executed by a color gamut design unit;

FIG. 17A shows an area where an O area is expanded, and FIG. 17B shows an area where a V area is expanded;

DETAILED DESCRIPTION

Hereinafter, exemplary embodiments of the present invention will be described with reference to the drawings.

Configuration of System

Figure 1:
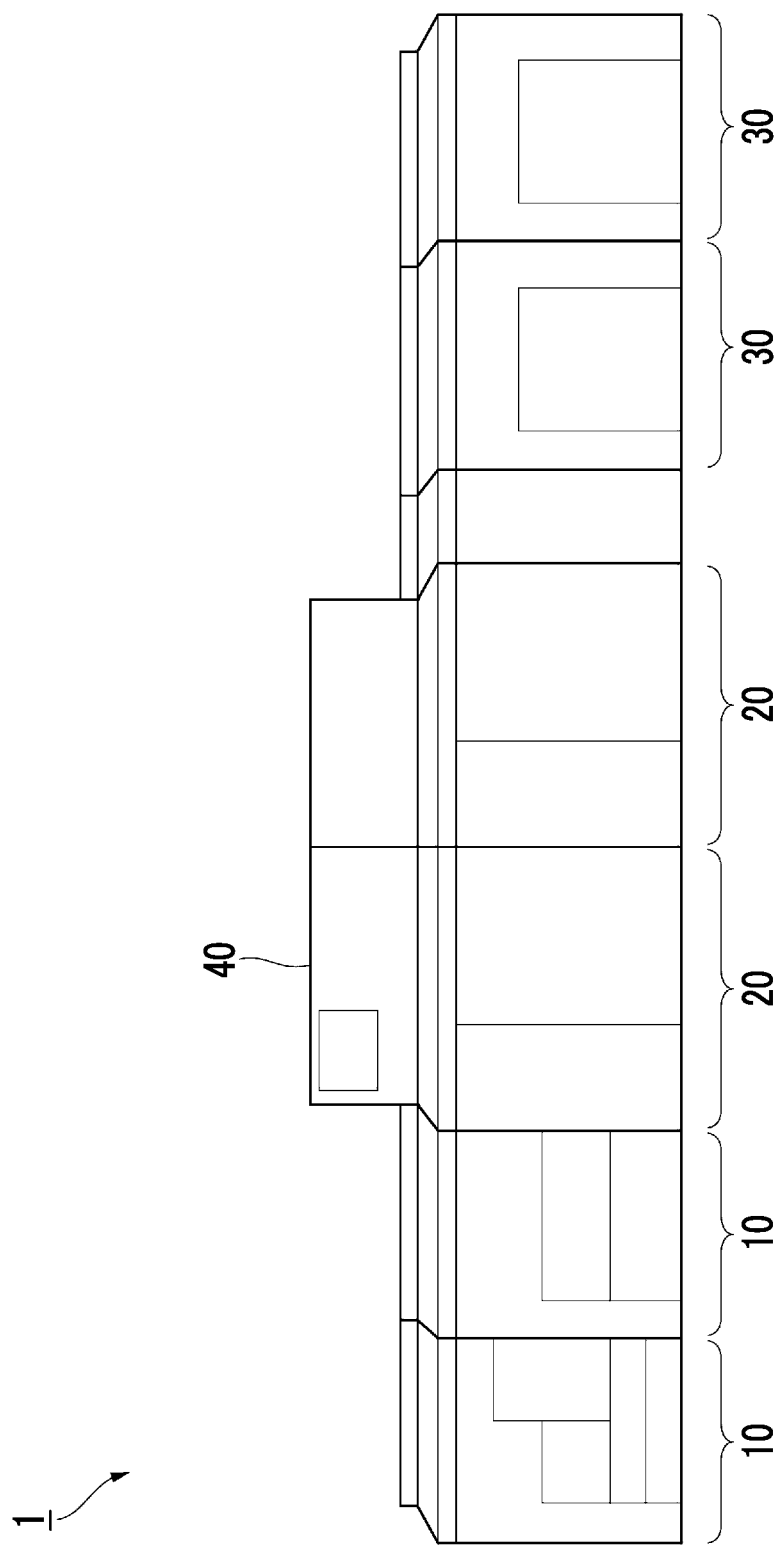
FIG. 1 is a diagram showing an example of a configuration of a printing system used in an exemplary embodiment.

FIG. 1 is a diagram showing an example of a configuration of a printing system 1 used in an exemplary embodiment.

The printing system 1 shown in FIG. 1 includes a paper feeding apparatus 10, a printing apparatus 20, a post-processing apparatus 30, and a control apparatus 40.

Here, the printing system 1 is an example of an image forming system, the printing apparatus 20 and the control apparatus 40 are examples of an image forming apparatus, and the control apparatus 40 is an example of an information processing apparatus.

The printing system 1 shown in FIG. 1 is also called a production printer. Although the printing system 1 is not limited to a production printer and may be a printer used in an office or a printer used at home. In addition to the print function, the printer used in the office is provided with a scanner function, a fax transmission and reception function, and the like. The difference between printers used in the office and printers used at home is performance.

In the printing system 1 shown in FIG. 1, two paper feeding apparatuses 10 are connected in series.

The paper feeding apparatus 10 is an apparatus that supplies paper P to the printing apparatus 20. In the case of the present exemplary embodiment, the paper feeding apparatus 10 accommodates cut paper. The paper feeding apparatus 10 accommodates, for example, 7000 sheets of cut paper. Although the paper P accommodated in the paper feeding apparatus 10 is not limited to the cut paper and may be roll paper. Here, the paper P is an example of a medium.

In the printing system 1 shown in FIG. 1, two printing apparatuses 20 are connected in series. The printing apparatus 20 in the present exemplary embodiment includes an engine (hereinafter, also referred to as a "printing engine") for printing an image on the paper P by using an electrophotographic method.

The printing engine prints the image on the paper P through processes of charging, exposure, development, transfer, and fixing. The printing engine is an example of a formation unit that forms the image on the paper P by using a plurality of color materials.

The printing apparatus 20 uses four types of toner corresponding to basic colors and one or two types of toner corresponding to spot colors for printing. The toner is an example of the color material. The image is not limited to so-called a figure or a photograph and may also include a text.

The printing apparatus 20 in the present exemplary embodiment includes a function of printing the image on both sides of the paper P in addition to a function of printing the image on one side of the paper P. The paper P on which the image is printed is called a printed matter.

In the printing system 1 shown in FIG. 1, two post-processing apparatuses 30 are connected in series. The post-processing apparatus 30 is provided with, for example, processing of discharging printed matters by shifting positions using the printed matter on the same page as a unit (that is, stack processing), staple processing of banding a plurality of sheets of paper P with a staple, and processing of binding the plurality of sheets of paper P with an adhesive tape.

The control apparatus 40 is an apparatus that controls the movement of the printing apparatus 20 and the like. The control apparatus 40 controls, for example, the generation or printing of a color chart, generation of a profile for color conversion, management of a printing job, and raster image processer (RIP) processing.

In the case of FIG. 1, the control apparatus 40 is disposed on an upper portion of a housing of the printing apparatus 20 but may be disposed in the housing of the printing apparatus 20.

Figure 2:
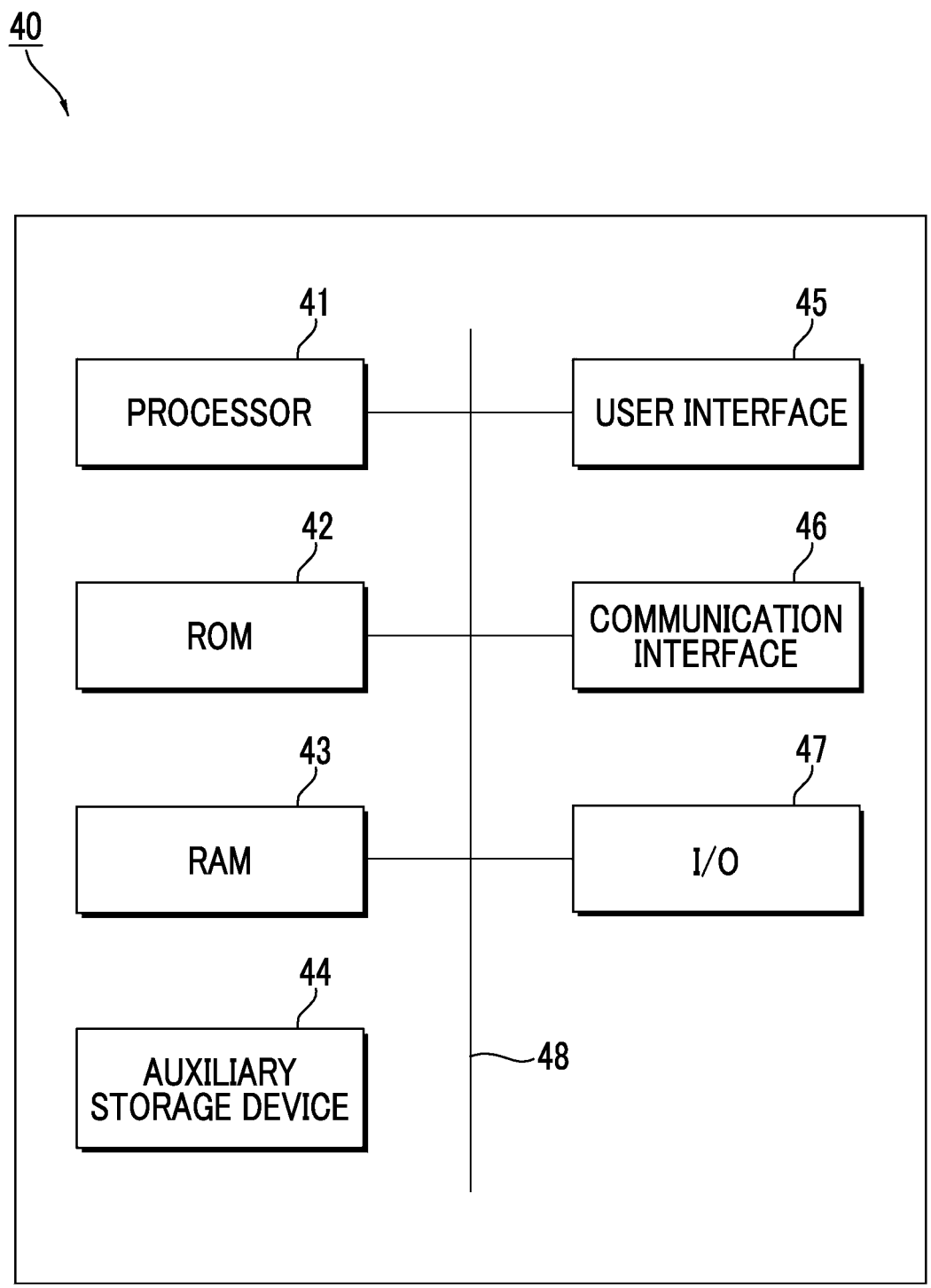
FIG. 2 is a diagram showing an example of a hardware configuration of a control apparatus.

FIG. 2 is a diagram showing an example of a hardware configuration of the control apparatus 40.

The control apparatus 40 shown in FIG. 2 includes a processor 41, a read only memory (ROM) 42 in which a basic input output system (BIOS) and the like are stored, a random access memory (RAM) 43 used as a work area of the processor 41, an auxiliary storage device 44, a user interface 45, a communication interface 46, and an I/O 47. Each portion of the control apparatus 40 is connected via a bus or other signal line 48.

The processor 41 is a device that implements various functions through the execution of a program.

The processor 41 in the present exemplary embodiment implements the various functions described above through the execution of the program. The processor 41, ROM 42, and RAM 43 function as a computer.

The auxiliary storage device 44 is, for example, a hard disk device or a semiconductor storage. Programs, printing jobs, and the like are stored in the auxiliary storage device 44. Programs are used as a general term for an operating system (OS) and an application program.

The user interface 45 is an interface that receives operations of a user who uses the printing apparatus 20. The user interface 45 includes, for example, an input unit such as a button for operation or a touch sensor for detecting an operation by a user's fingertip, and a display unit such as a liquid crystal display or an organic electro-luminescent (EL) display.

The communication interface 46 is an interface for communicating with a terminal or the like (not shown) operated by the user. Wired or wireless is used as a communication method of the communication interface 46. For example, ETHERNET (registered trademark), Wi-Fi (registered trademark), and the like are used as a communication standard of the communication interface 46.

The I/O 47 is a device used for communication among the processor 41 and the printing apparatus 20 and the like.

Processing Function

Hereinafter, a processing function implemented by the processor 41 through the execution of a program will be described. Here, the processing functions are two functions, which are a function of generating a color chart and a function of generating a profile for color conversion.

Function of Generating Color Chart

The function of generating the color chart is started through an operation of the user on the user interface 45.

Figure 3:
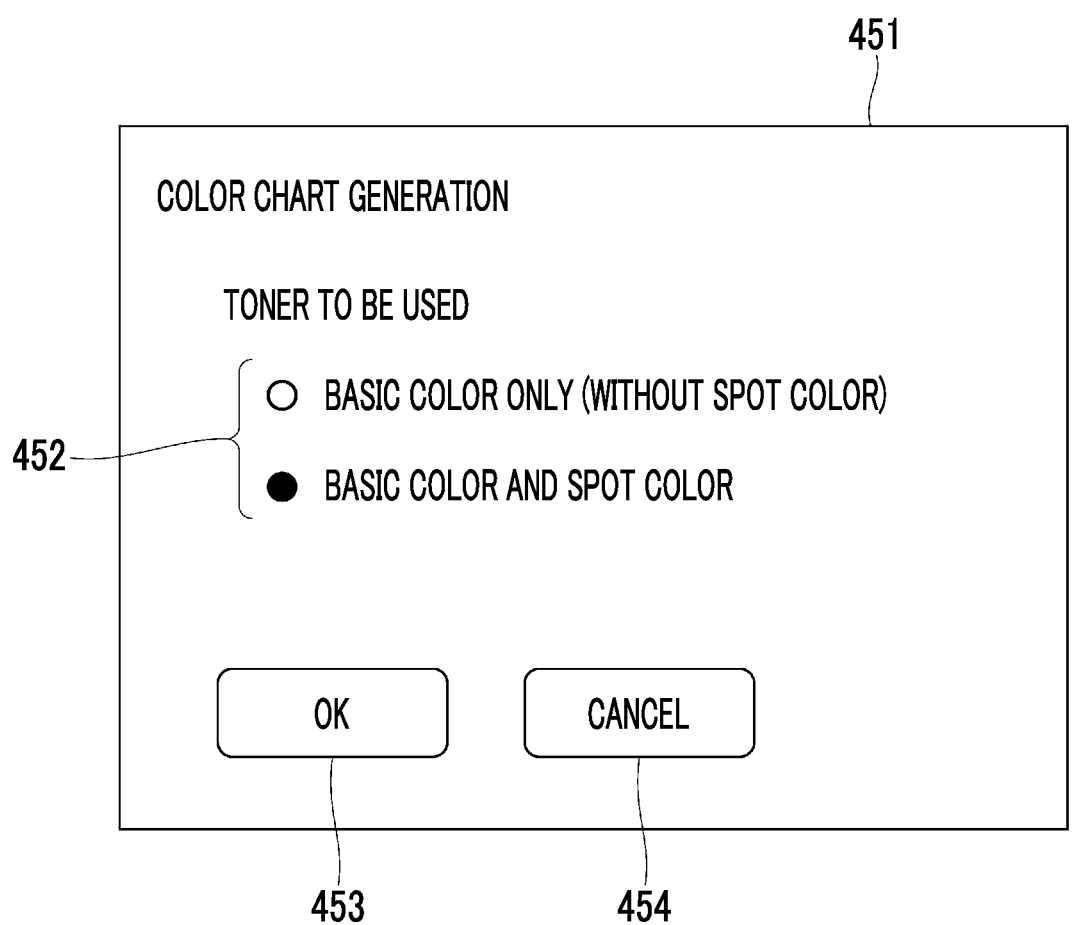
FIG. 3 is a diagram illustrating an example of an operation screen used for an instruction on the generation of a color chart.

FIG. 3 is a diagram illustrating an example of an operation screen 451 used for an instruction on the generation of the color chart.

An input field 452 for information that is related to toner to be used, an "OK" button 453 that is used for confirming the input, and a "Cancel" button 454 that is used for canceling the generation of the color chart are disposed on the operation screen 451.

In the present exemplary embodiment, toner is used as a color material in order to print an image by using the electrophotographic method. In a case where the image is printed by using an ink jet method, information related to ink is input. The ink is also an example of a color material.

Two options are displayed in the input field 452 shown in FIG. 3. One is an option corresponding to a case where the toner to be used is "basic color only", and the other is an option corresponding to a case where the toner to be used is "basic color and spot color".

Th spot colors include O (orange), G (green), and V (violet), which are secondary colors of the basic colors, as well as fluorescence P (pink), fluorescence Y (yellow), and fluorescence C (cyan), which are fluorescent colors.

Although the operation screen 451 shown in FIG. 3 is not provided with an item for designating the type of the spot color, an item for designating the type of the spot color may be provided. In FIG. 3, the "basic color and spot color" is selected as the toner to be used.

Figure 4A:
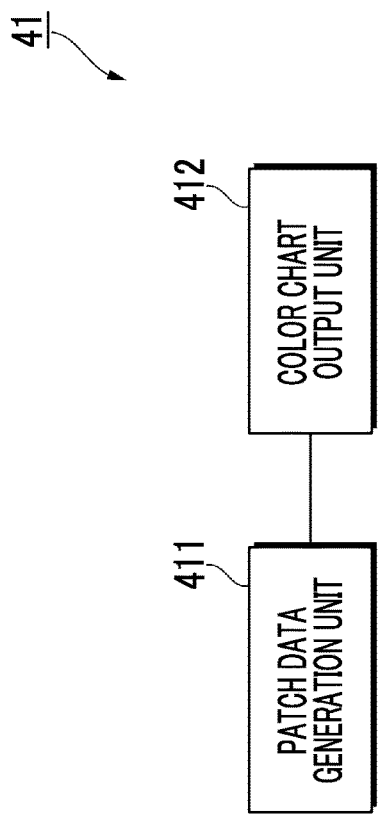
FIGS. 4A and 4B are diagrams illustrating an example of a functional configuration related to the generation of the color chart implemented by a processor.
Figure 4B:
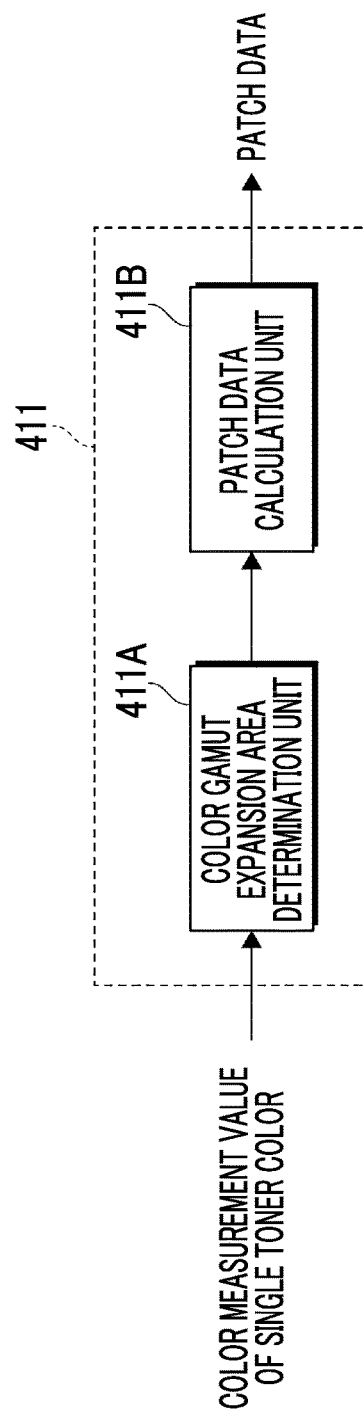

FIGS. 4A and 4B are diagrams illustrating an example of a functional configuration related to the generation of the color chart implemented by the processor 41 (see FIG. 2). FIG. 4A shows an example of the entire configuration, and FIG. 4B shows an example of an internal configuration of a patch data generation unit 411.

In the entire configuration shown in FIG. 4A, a patch data generation unit 411 and a color chart output unit 412 are shown. The patch data generation unit 411 is a functional unit that determines an area for expanding the color gamut in a case where the color chart is generated, and the color chart output unit 412 is a functional unit that uses the generated patch data and outputs the color chart in which a plurality of patches are arranged in a matrix shape. A patch is an area having a rectangular shape to which one color is associated.

The output of the color chart by the color chart output unit 412 may be output as data or output as a printed matter.

In a case where the color chart is output as the printed matter, the color chart output unit 412 gives data to the printing apparatus 20. As a result, the color chart is printed on the paper P from the printing apparatus 20. The completion of the calibration of the printing apparatus 20 does not matter at the time of printing the color chart.

As shown in FIG. 4B, the patch data generation unit 411 includes a functional unit 411A (hereinafter, referred to as a "color gamut expansion area determination unit") that determines an area for expanding the color gamut according to a color measurement value of a single toner color and a functional unit 411B (hereinafter, referred to as a "patch data calculation unit") for calculating the patch data constituting the color chart.

The color gamut expansion area determination unit 411A determines the area for expanding the color gamut in a case where the "basic color and spot color" is selected on the operation screen 451 (see FIG. 3), but the color gamut is not expanded in a case where the "basic color only" is selected.

The color gamut expansion area determination unit 411A may have one color gamut to be expanded or two color gamuts to be expanded depending on the difference in color materials to be used.

Figure 5:
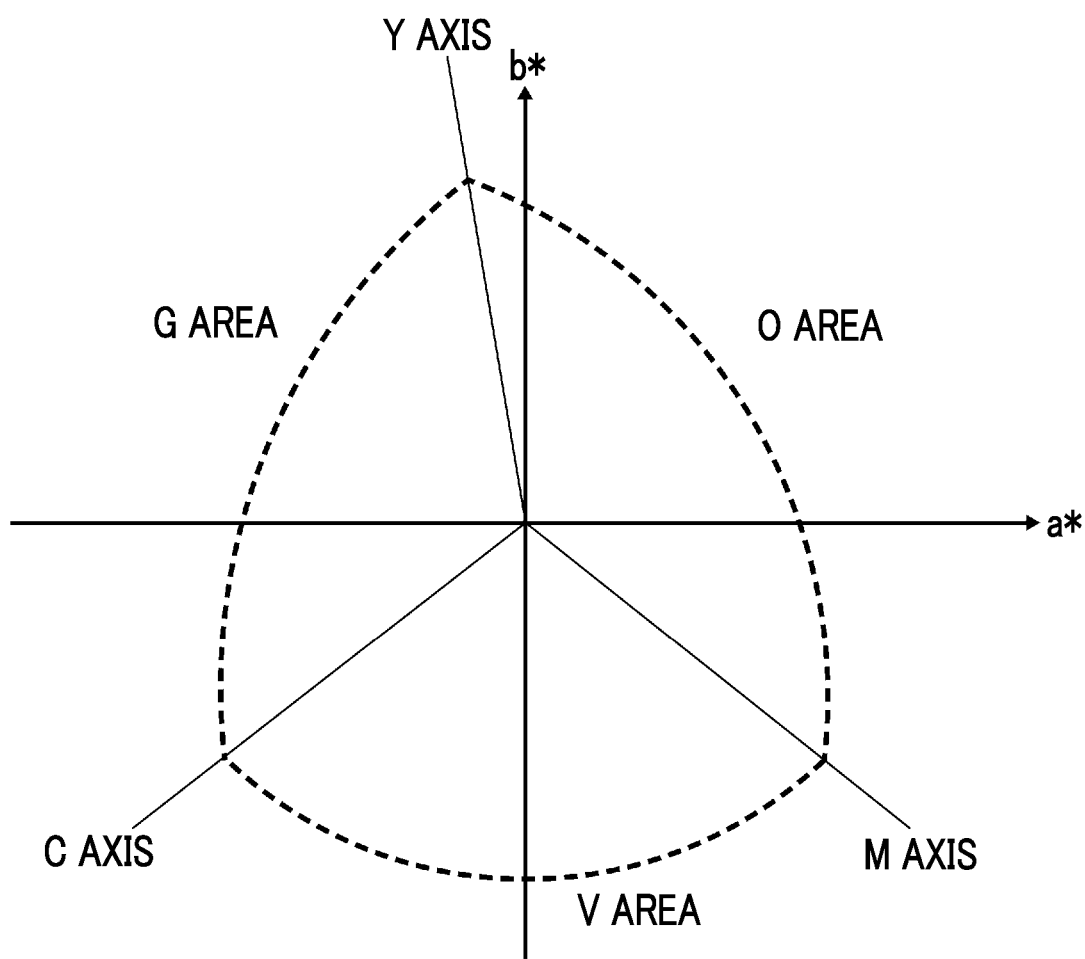
FIG. 5 is a diagram illustrating a relationship between a color of a color material and a color gamut in a color space.

FIG. 5 is a diagram illustrating relationships between the colors of the color materials and the color gamuts in a color space. The color space used in FIG. 5 is an L* a* b* color space. Incidentally, the color gamut shown in FIG. 5 is the color gamut seen from the high brightness side of L*. Therefore, the horizontal direction is defined as the a* axis, and the vertical direction is defined as the b* axis.

FIG. 5 shows three axes corresponding to three basic colors excluding K (black), that is, three colors of C (cyan), M (magenta), and Y (yellow). The C axis is an axis that passes through an original point and a coordinate point of C (cyan). The M axis is an axis that passes through the original point and a coordinate point of M (magenta). The Y axis is an axis that passes through the original point and a coordinate point of Y (yellow). The original point is W (white).

The color space is divided into three areas by these three axes.

One is the area between the Y axis and the M axis. The above area is an area that corresponds to the secondary color of Y and M and is called an O (orange) area.

One is the area between the C axis and the M axis. The above area is an area that corresponds to the secondary color of C and M and is called a V (violet) area.

One is the area between the C axis and the Y axis. The above area is an area that corresponds to the secondary color of C and Y and is called a G (green) area.

The color gamut expansion area determination unit 411A determines an area for expanding any one or two of the O area, the V area, and the G area.

Details of Processing

Figure 6:
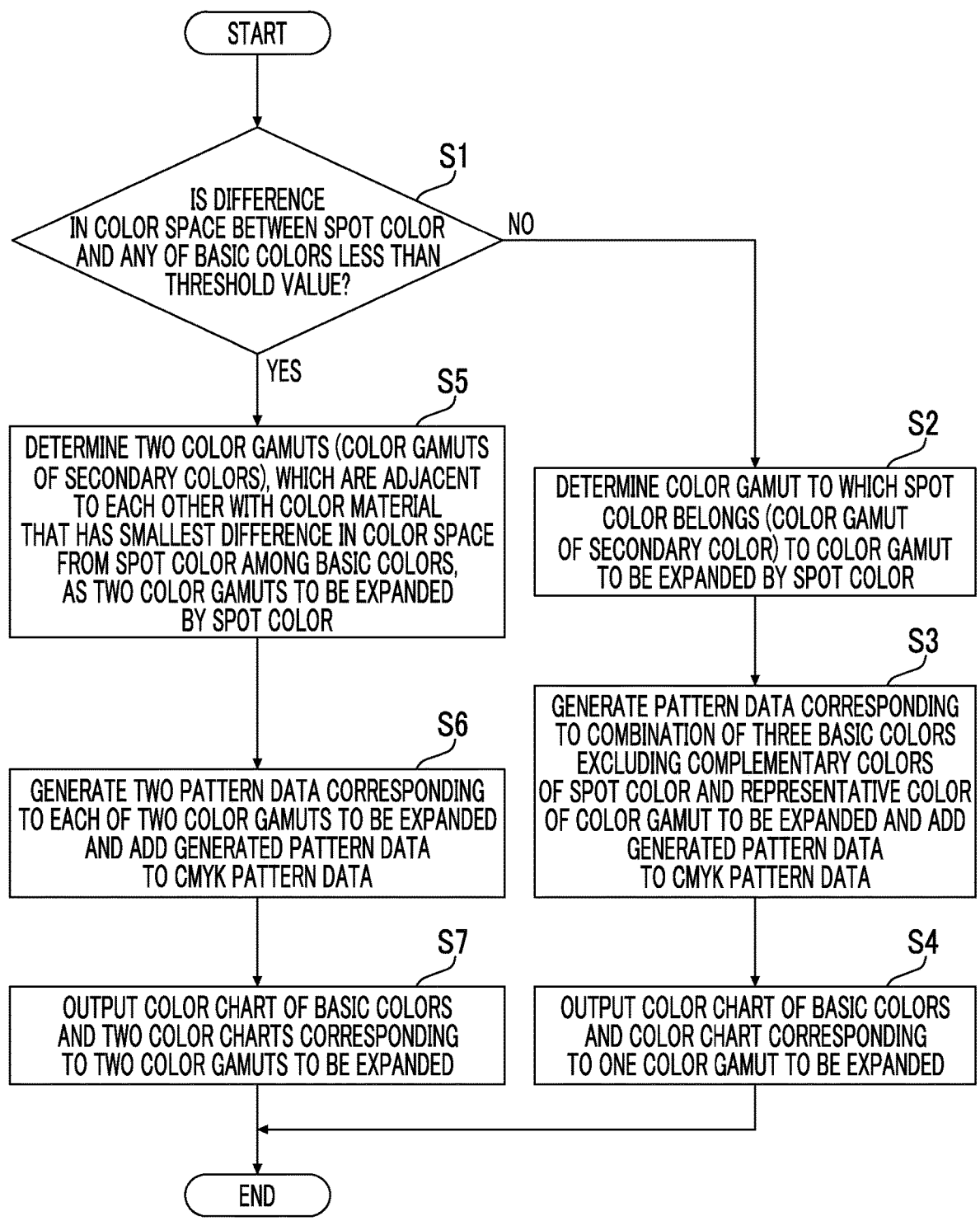
FIG. 6 is a flowchart illustrating an example of a processing procedure executed through a function of generating the color chart.

FIG. 6 is a flowchart illustrating an example of a processing procedure executed through a function of generating the color chart.

The processing procedure shown in FIG. 6 is implemented through the execution of a program by the processor 41 (see FIG. 2). The symbol "S" represents a step in the figure.

The processing procedure shown in FIG. 6 assumes the case where the toner corresponding to the spot color is used.

First, the processor 41 determines whether or not a difference in the color space between the spot color and any of the basic colors is less than a threshold value (step S1). Examples of the difference in color space include a color difference, and a hue difference.

Of the color difference and the hue difference, the color difference is calculated as a distance between two colors. The color difference is not limited to the distance in the plane illustrated in FIG. 5 and is calculated as a distance in the three-dimensional space including the direction of the L* axis. The phase difference is a difference in phase angle.

Figure 7:
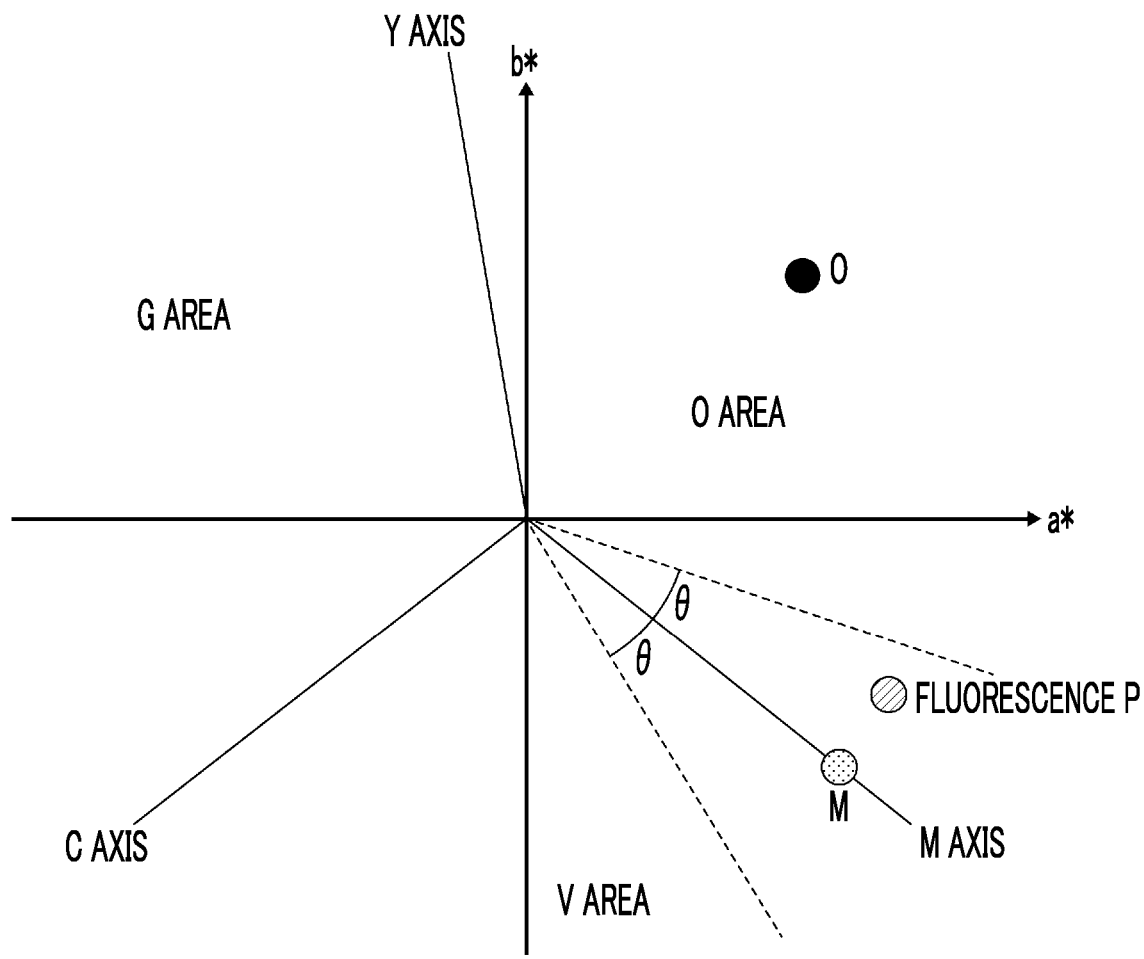
FIG. 7 is a diagram illustrating an example in which a phase difference between a spot color and a basic color is less than a threshold value.

FIG. 7 is a diagram illustrating an example in which a phase difference between a spot color and a basic color is less than a threshold value. In the color space shown in FIG. 7, O (orange) and fluorescence P (pink) are mapped as the spot colors. Here, the fluorescence P is an example of a fourth color material.

In the case of FIG. 7, a phase difference between a coordinate point of the fluorescence P and the M axis is less than a threshold value θ. Incidentally, a phase difference between the coordinate point of the fluorescence P and the Y axis or the C axis is larger than the threshold value θ.

On the other hand, O (orange) is a secondary color in which M and Y are mixed in the same ratio. Therefore, in the case of FIG. 7, a coordinate point of O is positioned on a phase angle that divides the Y axis and the M axis into two. Therefore, a phase difference between the coordinate point of O and each axis is larger than the threshold value θ.

For example, in a case where the spot color is O, the processor 41 obtains a negative result in step S1.

In a case where the negative result is obtained in step S1, the processor 41 determines the color gamut to which the spot color belongs (the color gamut of the secondary color) to the color gamut to be expanded by the spot color (step S2).

Figures 8, 9:
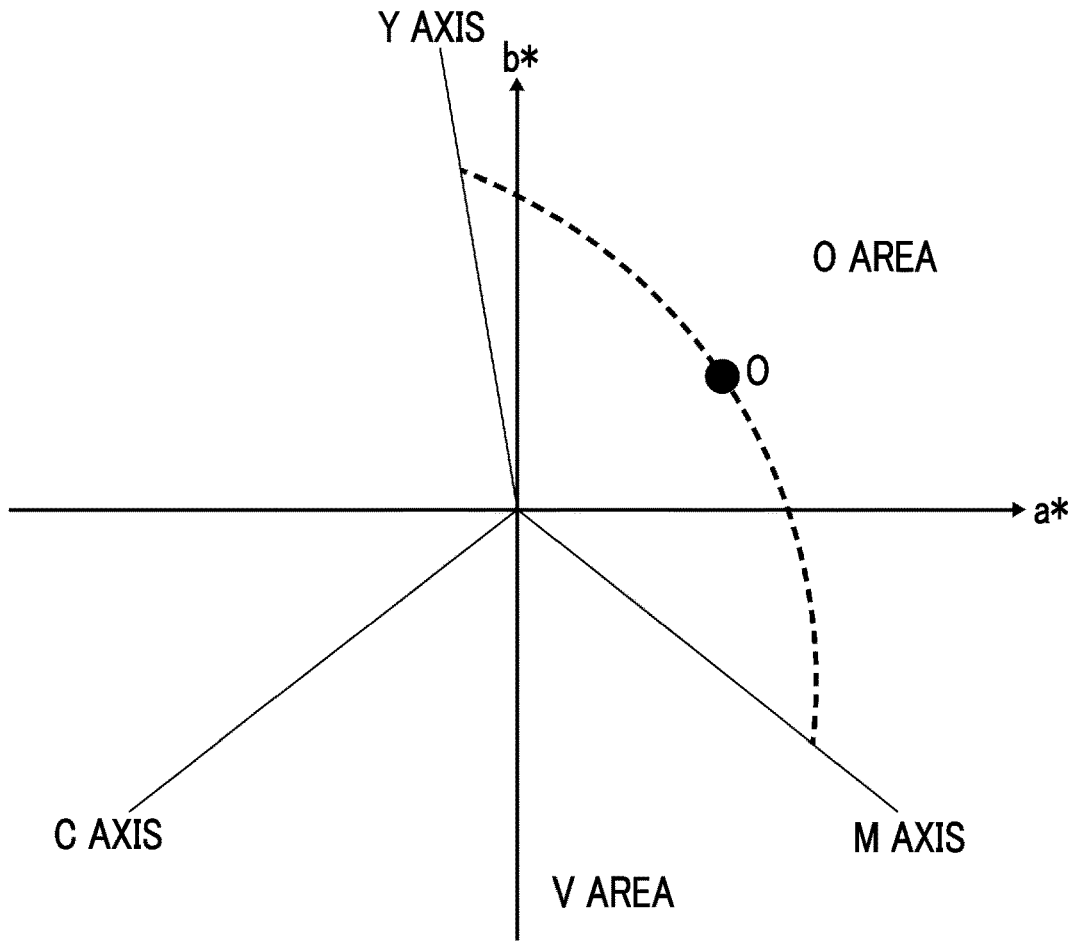
FIG. 8 is a diagram illustrating a relationship between a spot color for which a negative result is obtained in step S1 and a color gamut of a secondary color to be expanded.
FIG. 9 is a diagram illustrating a relationship between the spot color and the color gamut to be expanded.

FIG. 8 is a diagram illustrating a relationship between the spot color for which a negative result is obtained in step S1 and the color gamut of the secondary color to be expanded. In FIG. 8, the assumption is made that the spot color is O (orange). In this case, the processor 41 determines the O area, which belongs to O, to an area to be expanded.

Of course, in a case where the spot color for which a negative result is obtained in step S1 is another color, the area to be expanded is also a different area of secondary color.

FIG. 9 is a diagram illustrating the relationship between the spot color and the color gamut to be expanded. The spot color shown in FIG. 9 assumes a color material for which a negative result can be obtained in step S1.

In FIG. 9, the description is made that the O area is expanded in a case where the spot color is O (orange), the G area is expanded in a case where the spot color is G (green), and the V area is expanded in a case where the spot color is V (violet).

FIG. 9 shows that O as a spot color is close to the secondary color of Y=100 and M=100, that is, the spot color O belongs to the O area.

Further, FIG. 9 shows that G as a spot color is close to the secondary color of Y=100 and C=100, that is, the spot color G belongs to the G area.

Further, FIG. 9 shows that V as a spot color is close to the secondary color of C=100 and M=100, that is, the spot color V belongs to the V area.

Referring back to FIG. 6.

In a case where the color gamut to be expanded is determined, the processor 41 generates pattern data (hereinafter, also referred to as "expansion pattern data") corresponding to the combination of three basic colors excluding the complementary colors of the spot color and the representative color of the color gamut to be expanded, and adds the generated pattern data to the CMYK pattern data (hereinafter, also referred to as "basic pattern data") (step S3).

The pattern data here is a set of combinations of values of four color materials that reproduce colors corresponding to each coordinate point.

That is, at the time step S3 is executed, there are two pattern data, the basic pattern data and the expansion pattern data.

Next, the processor 41 outputs a color chart of basic colors and a color chart corresponding to one color gamut to be expanded (step S4).

Next, a case where the spot color is a fluorescent color will be described. In this case, the processor 41 obtains a positive result in step S1.

In a case where a positive result is obtained in step S1, the processor 41 determines the two color gamuts (color gamuts of the secondary colors), which are adjacent to each other with the color material that has the smallest difference in color space from the spot color among the basic colors, as two color gamuts to be expanded by the spot color (step S5).

Figures 10, 11:
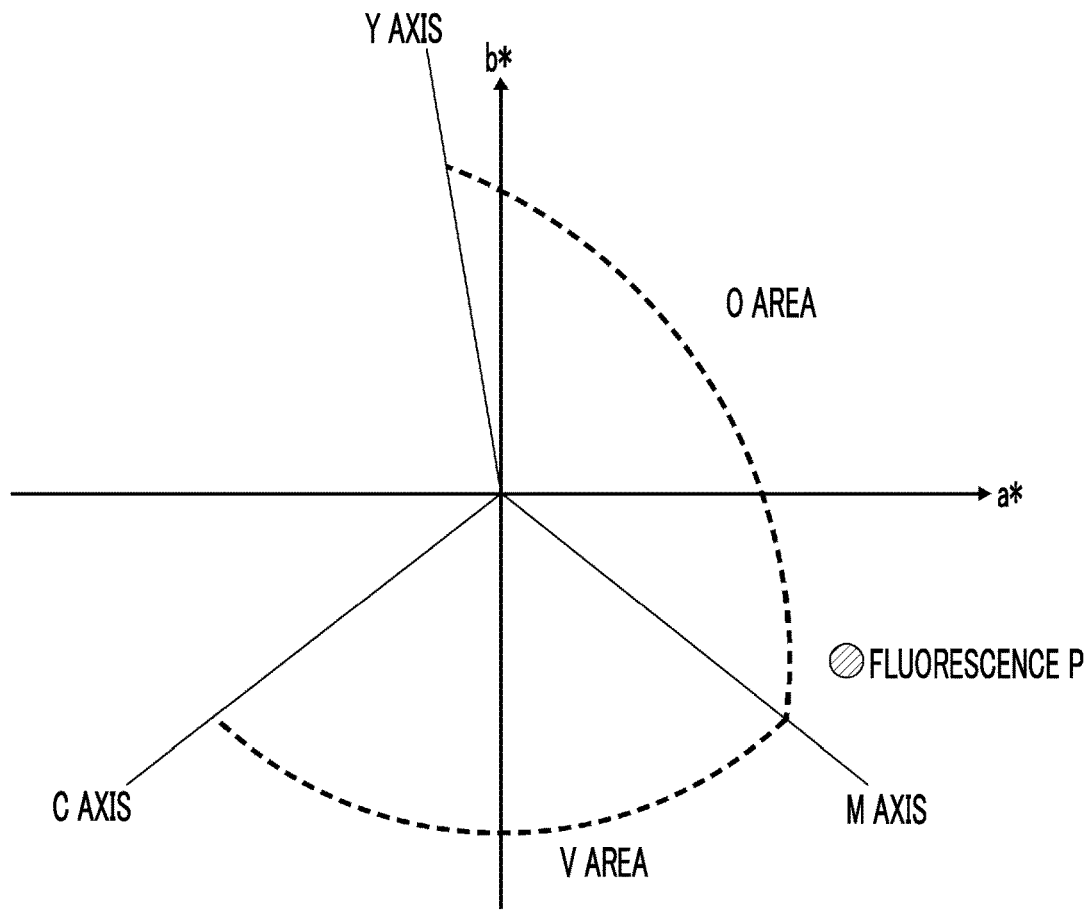
FIG. 10 is a diagram illustrating a relationship between a spot color for which a positive result is obtained in step S1 and two color gamuts to be expanded.
FIG. 11 is a diagram illustrating another relationship between the spot color and the color gamut to be expanded.

FIG. 10 is a diagram illustrating a relationship between the spot color for which a positive result is obtained in step S1 and the two color gamuts to be expanded.

In FIG. 10, the assumption is made that the spot color is a fluorescence P (pink). In this case, the processor 41 determines that a difference between the coordinate point of the fluorescence P and the M axis is less than the threshold value and determines the O area and the V area, which are adjacent to each other with the M axis held in between, as the two areas to be expanded.

In the case of FIG. 10, the M toner, which is a color material that defines the M axis, is an example of a first color material.

Further, the Y toner, which is a color material that defines the Y axis, is an example of a second color material. In this case, the color used for expanding the O area is an example of a first color.

Further, the C toner, which is a color material that defines the C axis, is an example of a third color material. In this case, the color used for expanding the V area is an example of a second color.

Of course, in a case where the spot color for which a positive result is obtained in step S1 is another color, the combination of the two areas to be expanded is also different.

FIG. 11 is a diagram illustrating another relationship between the spot color and the color gamut to be expanded. The spot color shown in FIG. 11 assumes a color material for which a positive result can be obtained in step S1.

In FIG. 11, the description is made that the O area and the V area are expanded in a case where the color of the color material that is close to the color of the spot color is M (magenta), the O area and the G area are expanded in a case where the color of the color material that is close to the color of the spot color is Y (yellow), and the G area and the V area are expanded in a case where the color of the color material that is close to the color of the spot color is C (cyan).

For example, in a case where the color of the color material that is close to the color of the spot color is Y (yellow), the Y toner is an example of the first color material, the M toner is an example of the second color material, and the C toner is an example of the third color material. In this case, the color used for expanding the O area is an example of the first color, and the color used for expanding the G area is an example of the second color.

Further, for example, in a case where the color of the color material that is close to the color of the spot color is C (cyan), the C toner is an example of the first color material, the M toner is an example of the second color material, and the Y toner is an example of the third color material. In this case, the color used for expanding the G area is an example of the first color, and the color used for expanding the V area is an example of the second color.

Referring back to FIG. 6.

In a case where the color gamut to be expanded is determined, the processor 41 generates two pattern data (that is, "expansion pattern data") corresponding to each of the two color gamuts to be expanded and adds the generated pattern data to the CMYK pattern data (that is, "basic pattern data") (step S6).

That is, at the time step S6 is executed, there are three pattern data, the basic pattern data and the two expansion pattern data.

Next, the processor 41 outputs a color chart of basic colors and a color chart corresponding to two color gamuts to be expanded (step S7).

Figure 12C:
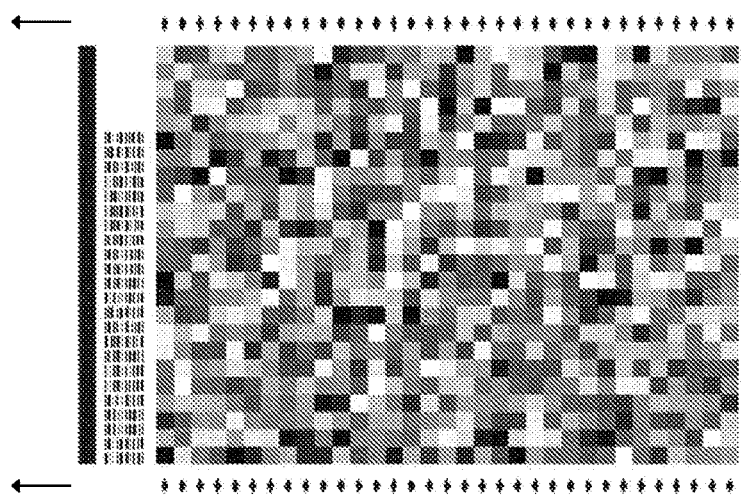
FIGS. 12A to 12C are diagrams illustrating an example of an output of the color chart in a case where two color gamuts are expanded by adding one spot color.
Figure 12B:
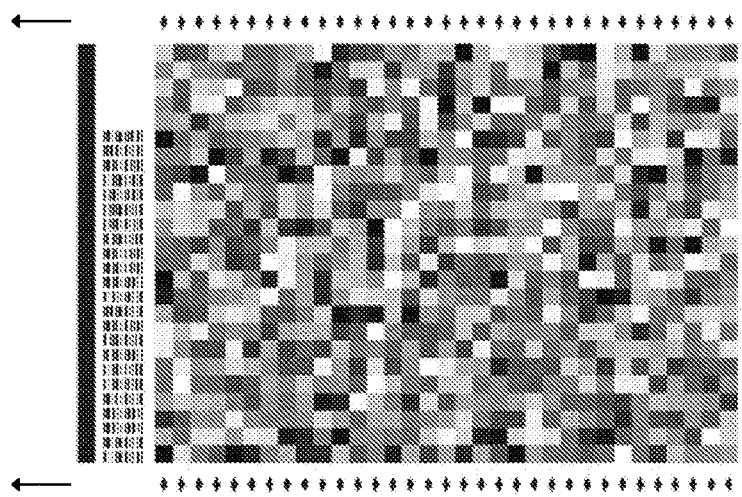
Figure 12A:
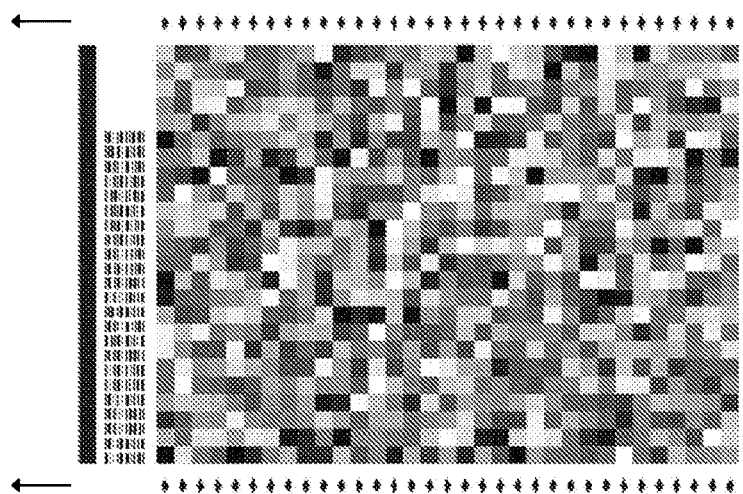

FIGS. 12A to 12C are diagrams illustrating an example of an output of the color chart in a case where two color gamuts are expanded by adding one spot color. FIG. 12A is a color chart of the color gamut reproduced by CMYK, FIG. 12B is a color chart of the color gamut reproduced by MYKP, and FIG. 12C is a color chart of the color gamut reproduced by CMKP.

The color chart shown in FIG. 12A represents a color chart in which patches that represent colors reproduced by the C toner, the M toner, the Y toner, and the K toner corresponding to the basic colors, are arranged in a matrix shape. The color chart shown in FIG. 12A is an example of a first color chart.

The color chart shown in FIG. 12B represents a color chart in which patches that represent colors reproduced by the M toner, the Y toner, the K toner, and the fluorescence P toner excluding C (cyan), which is the complementary color of the O area, are arranged in a matrix shape. The color chart shown in FIG. 12B is an example of a second color chart.

The color chart shown in FIG. 12C represents a color chart in which patches that represent colors reproduced by the C toner, the M toner, the K toner, and the fluorescence P toner excluding Y (yellow), which is the complementary color of the V area, are arranged in a matrix shape. The color chart shown in FIG. 12C is an example of a third color chart.

The color chart shown in FIG. 12A is generated by using the basic pattern data.

The color chart shown in FIG. 12B and the color chart shown in FIG. 12C are generated by using the expansion pattern data.

As described above, in the color chart corresponding to the expansion pattern data, the color chart is generated by using the color material of the basic color excluding the complementary color of the color gamut to be expanded and the color material corresponding to the spot color capable of expanding the color gamut.

FIG. 13 is a diagram summarizing a relationship between the pattern data generated by the patch data generation unit 411 (see FIG. 4A) and the spot color.

First, in a case where the spot color is not used (in the case of "none"), only the color chart corresponding to the basic pattern data is output.

In a case where the spot color is O (orange), two color charts corresponding to the expansion pattern data, in which C is replaced with the spot color, and the basic pattern data are output.

In FIG. 13, the color material corresponding to the expansion pattern data is represented as "MYK+O". The basic color C is replaced with O. The "+" symbol here represents that a secondary color is represented by the colors before and after the symbol. That is, a secondary color is represented by the color that can be represented by "MYK" and "O".

Similarly, in a case where the spot color is G (green), two color charts corresponding to the expansion pattern data, in which M is replaced with the spot color, and the basic pattern data are output. In FIG. 13, the color material corresponding to the expansion pattern data is represented as "CYK+G". The basic color M is replaced with G.

Similarly, in a case where the spot color is V (violet), two color charts corresponding to the expansion pattern data, in which Y is replaced with the spot color, and the basic pattern data are output. In FIG. 13, the color material corresponding to the expansion pattern data is represented as "CMK+V". The basic color Y is replaced with V.

On the other hand, in a case where the spot color is the fluorescence P (pink), three color charts corresponding to the expansion pattern data in which C is replaced with the spot color, the expansion pattern data in which Y is replaced with the spot color, and the basic pattern data, are output. In FIG. 13, the color material corresponding to the first expansion pattern data is represented by "MYK+fluorescence P", and the color material corresponding to the second expansion pattern data is represented by "CMK+fluorescence P".

Similarly, in a case where the spot color is the fluorescence Y (yellow), three color charts corresponding to the expansion pattern data in which C is replaced with the spot color, the expansion pattern data in which M is replaced with the spot color, and the basic pattern data, are output. In FIG. 13, the color material corresponding to the first expansion pattern data is represented by "MYK+fluorescence Y", and the color material corresponding to the second expansion pattern data is represented by "CYK+fluorescence Y".

Similarly, in a case where the spot color is the fluorescence C (cyan), three color charts corresponding to the expansion pattern data in which M is replaced with the spot color, the expansion pattern data in which Y is replaced with the spot color, and the basic pattern data, are output. In FIG. 13, the color material corresponding to the first expansion pattern data is represented by "CYK+fluorescence C", and the color material corresponding to the second expansion pattern data is represented by "CMK+fluorescence C".

As described above, in the case of the present exemplary embodiment, depending on a difference in phase space between the spot color that can be used for printing and the basic color, up to two expansion pattern data used in a case where the color gamut can be expanded by using the spot color, may be used. For example, as shown in FIG. 10, the expansion pattern data corresponds to the color gamut to be expanded. Therefore, in a case where a spot color having a small difference in phase space with the basic color can be used, by making the two expansion pattern data to be output, the expansion of the color gamut that may be reproduced is possible as compared with the case where only one expansion pattern data is output.

Function of Generating Profile for Color Conversion

The function of generating a profile for color conversion is started through an optical reading of the color chart.

FIG. 14 is a diagram illustrating an example of a functional configuration related to the generation of the profile for color conversion implemented by the processor 41 (see FIG. 2).

FIG. 14 shows a patch color measurement unit 421, a profile generation unit 422, a profile reading unit 423, and a color conversion unit 424.

The patch color measurement unit 421 is a functional unit that optically measures the colors of the color charts shown in FIGS. 12A to 12C, for example. Specifically, a value that specifies a color of the patch arranged in a matrix shape (hereinafter, also referred to as a "color measurement value") is output. For example, the patch color measurement unit 421 outputs the coordinate values (L*, a*, b*) of the L* a* b* color space as the color measurement values. In a case where the color of the patch is read by using a colorimeter that directly reads a tristimulus values that is close to the sensitivity of the human eye, the patch color measurement unit 421 may be implemented as a part of the function of the colorimeter (not shown).

The profile generation unit 422 is a functional unit that generates a profile for reproducing the measured color with a plurality of toners. The profile here is a combination of toner values used for reproducing a particular color.

Figure 15:
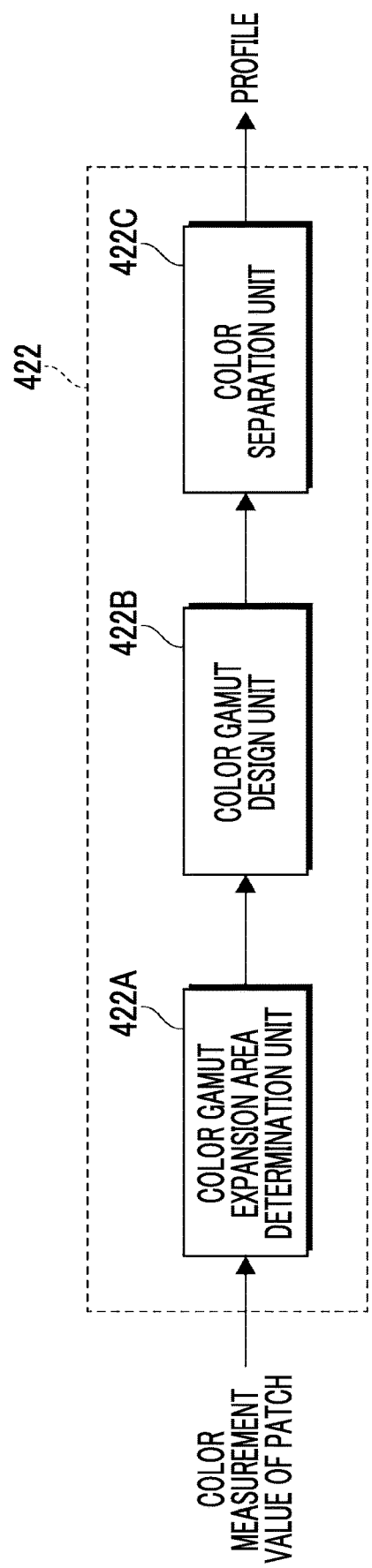
FIG. 15 is a diagram illustrating an example of a functional configuration of a profile generation unit.

FIG. 15 is a diagram illustrating an example of a functional configuration of the profile generation unit 422.

As shown in FIG. 15, the profile generation unit 422 includes a color gamut expansion area determination unit 422A, a functional unit (hereinafter, referred to as a "color gamut design unit") 422B that designs the determined color gamut, and a functional unit (hereinafter, referred to as a "color separation unit") 422C that calculates the combination of the values of the color materials that reproduce each color in the designed color gamut.

The color gamut expansion area determination unit 422A here is the same functional unit as the color gamut expansion area determination unit 411A (see FIG. 4B). Therefore, in a case where the function, which is implemented by the processor 41, includes the function of generating the color chart, the color gamut expansion area determination unit 411A can be diverted as the color gamut expansion area determination unit 422A.

The color gamut design unit 422B is a functional unit that designs the outline of the color gamut after the expansion. In other words, the color gamut design unit 422B is a functional unit that designs a boundary between the two color gamuts after the expansion. In a case where targets of colors (targets of colors designated by Japan Color (registered trademark) 2011 or Pantone (registered trademark)) are colors outside the color gamut of a printer, the design of the boundary of the color gamut is used in a Gamut Mapping in a case where converting to printer-reproducible colors.

In a case where the color gamuts of the secondary colors are expanded individually, the existence of other color gamuts adjacent to each other is not taken into consideration. As a result, the outline portion of the two color gamuts after expansion have to overlap.

In a case where the overlap is not fixed, a color gamut outline is also generated in the color gamut inner area, and the combination of color gamut outlines to be color-converted by the Gamut Mapping is not determined to be one. That is, the profile is not determined.

Therefore, in the present exemplary embodiment, the color gamut design unit 422B is used as a function of addressing the overlap of the outline portions of the two color gamuts after the expansion in a case where the spot color such as the fluorescence P (pink) can be used.

The color separation unit 422C is a functional unit that searches for the combination of values of color materials that reproduce each color in the designed color gamut. The output of the color separation unit 422C is the profile.

Referring back to FIG. 14.

The profile reading unit 423 is a functional unit that reads the profile generated by the profile generation unit 422 and gives the profile to the color conversion unit 424.

The color conversion unit 424 is a functional unit that converts the combination of values of the color materials that reproduce a color designated in the input data given as a printing job into output data.

Details of Processing

Color Gamut Settings

FIG. 16 is a flowchart illustrating an example of a processing procedure executed by the color gamut design unit 422B (see FIG. 15).

The processing procedure shown in FIG. 16 is implemented through the execution of a program by the processor 41 (see FIG. 2). The symbol "S" represents a step in the figure.

First, the processor 41 calculates the color gamut of CMYK, which are the basic colors (step S11). Since the colors in the color gamut are reproduced using the C toner, the M toner, the Y toner, and the K toner, the listed toners are excluded from the color gamut after the expansion.

Next, the processor 41 expands one of the two color gamuts to be expanded (for example, the O area) (step S12).

Subsequently, the processor 41 expands the other of the two color gamuts to be expanded (for example, the V area) (step S13).

Thereafter, the processor 41 removes a common face between the two color gamuts after the expansion (step S14). The common face is a color gamut that represents the same color.

Images of the processing corresponding to steps S11 to S14 will be described with reference to FIGS. 17 to 22.

Figure 17A:
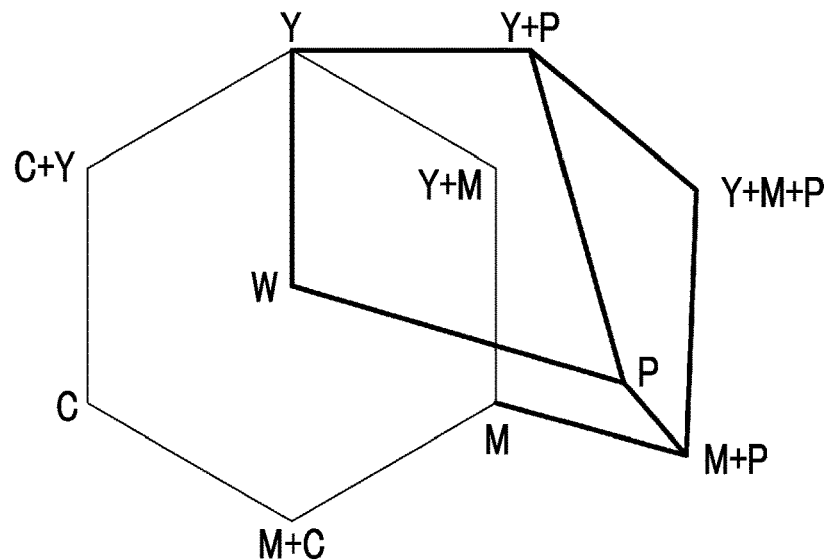
FIGS. 17A and 17B are diagrams illustrating an example of two color gamuts after the expansion.
Figure 17B:
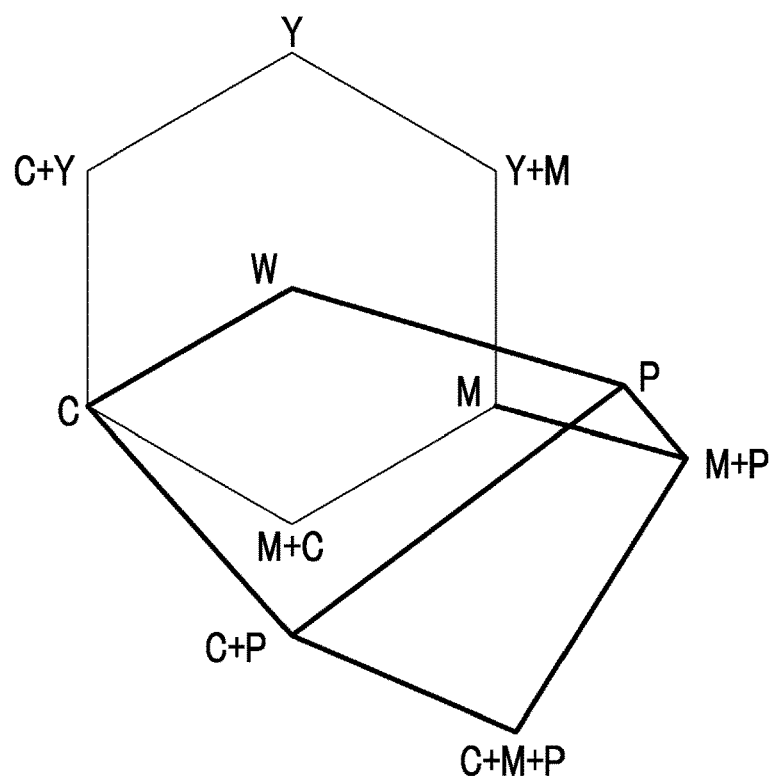

FIGS. 17A and 17B are diagrams illustrating an example of the two color gamuts after the expansion. FIG. 17A shows an area where the O area is expanded, and FIG. 17B shows an area where the V area is expanded.

The hexagonal portions shown in FIGS. 17A and 17B represent the color gamuts that can be reproduced with the three basic colors excluding K (black). Therefore, the color gamut after the expansion refers to the color gamut excluding the hexagonal portion.

Incidentally, "Y+M" in the figure corresponds to O (orange), "Y+C" corresponds to G (green), and "M+C" corresponds to V (violet).

Further, the "W" at the center of the hexagon indicates white.

As can be seen by comparing FIGS. 17A and 17B, there is an overlap in the expanded color space in the vicinity of M (magenta).

Figure 18:
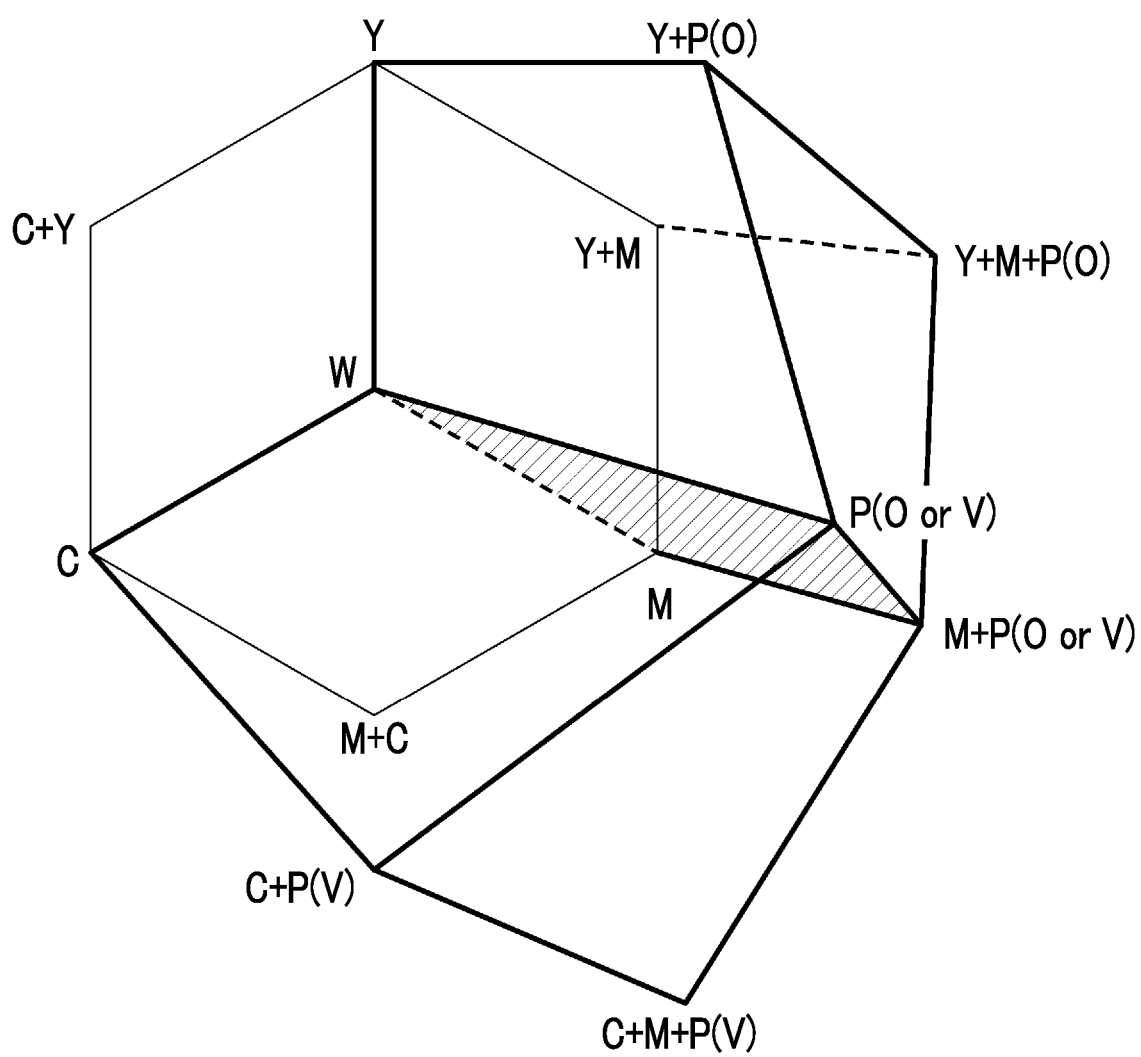
FIG. 18 is a diagram representing an overlap of two expanded color gamuts.

FIG. 18 is a diagram representing the overlap of two expanded color gamuts. In FIG. 18, a portion where the color gamut shown in FIG. 17A and the color gamut shown in FIG. 17B overlap is shown with shading. The color gamut design unit 422B in the present exemplary embodiment addresses the overlapping portion.

Figure 19:
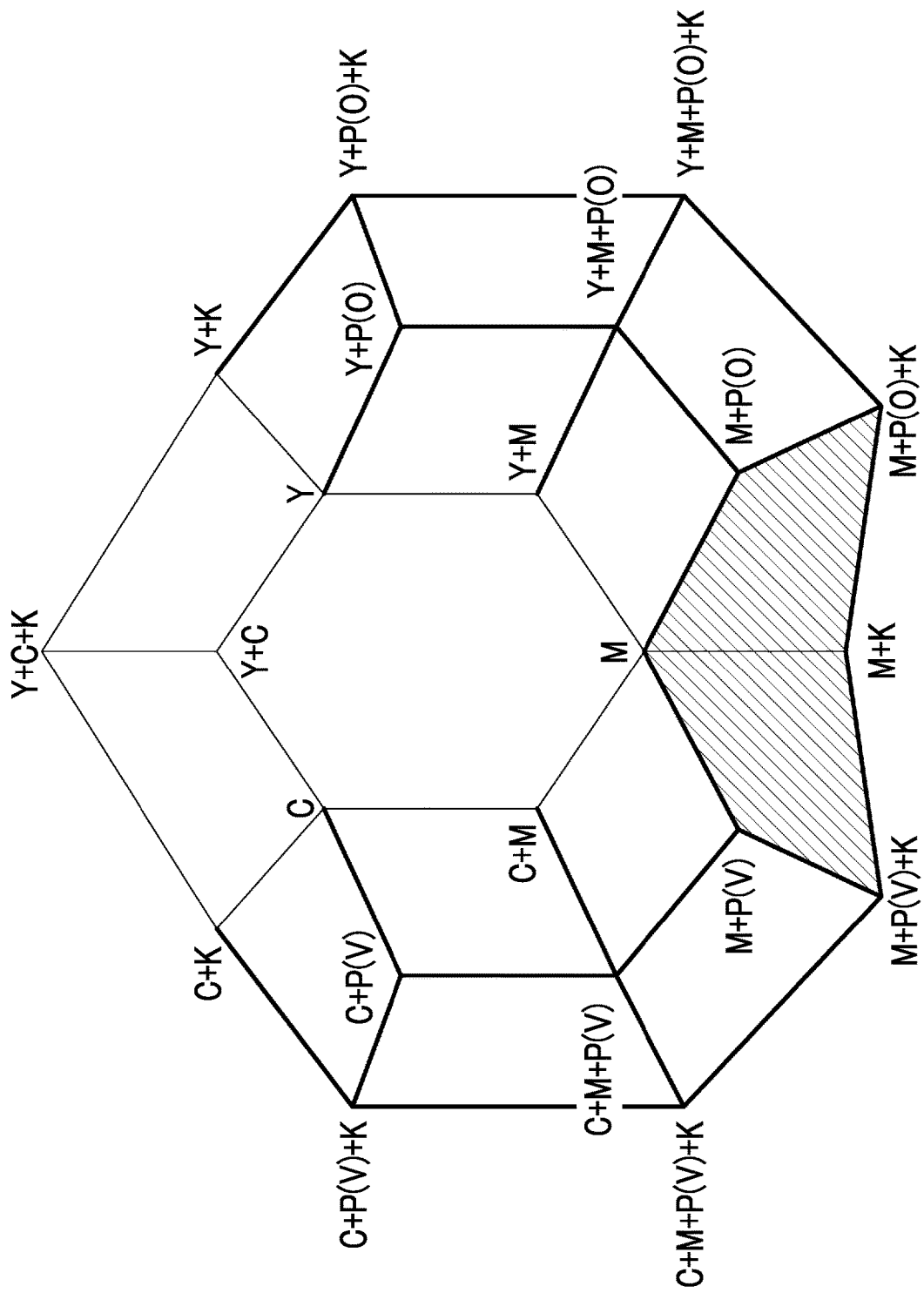
FIG. 19 is a diagram representing a color gamut including the basic color K (black)

FIG. 19 is a diagram representing the color gamut including the basic color K (black). In FIG. 19, the hue in FIG. 18 is changed to a clockwise rotated representation in consideration of the symmetry of the color gamut. Therefore, the positions at 12 o'clock are "Y+C" and "Y+C+K". Further, the positions at 6 o'clock are "M" and "M +K". Therefore, the shaded portion that represents the overlap of the color gamuts is positioned in the vicinity of substantially 5 o'clock to 7 o'clock.

Figure 20:
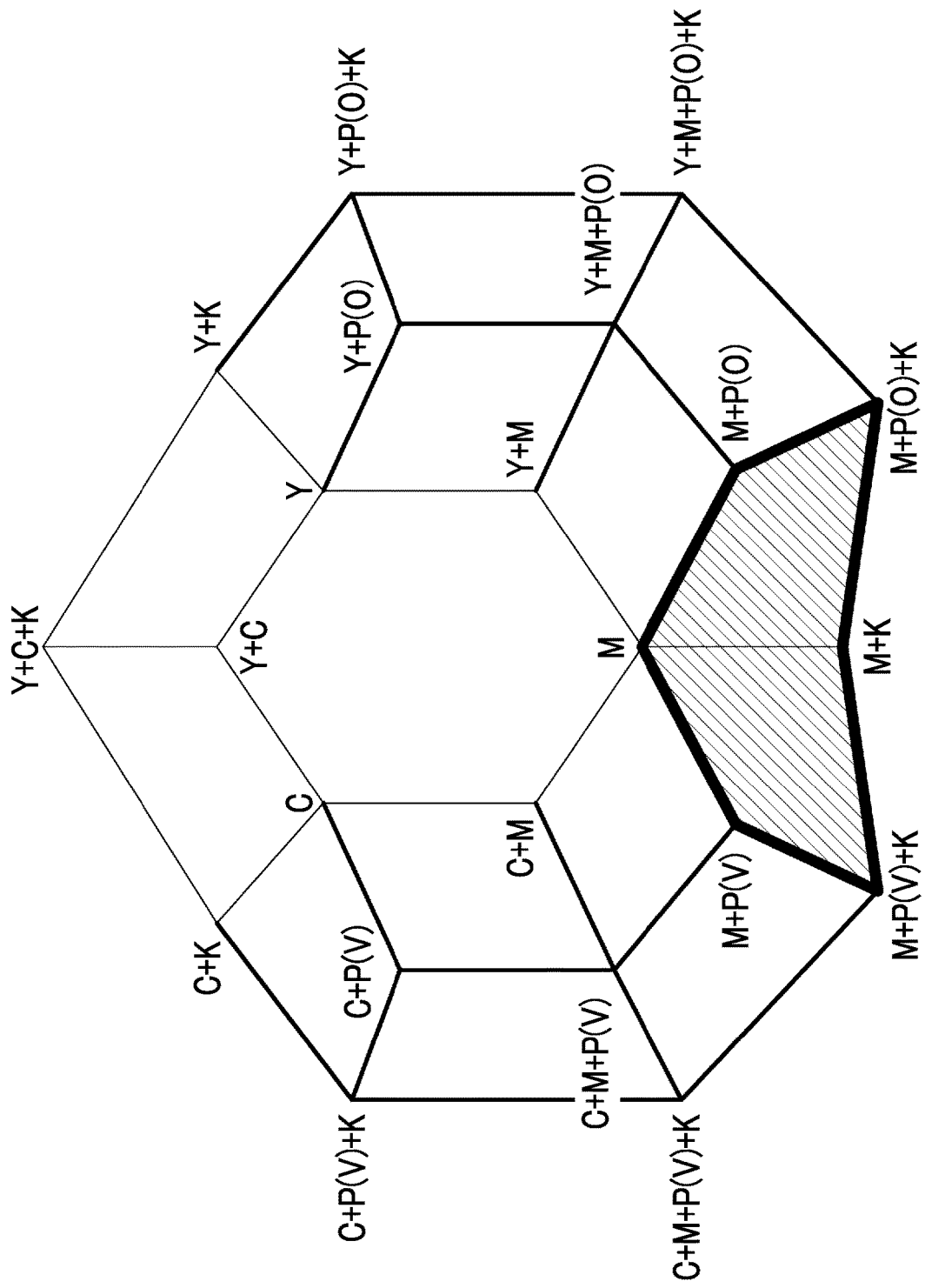
FIG. 20 is a diagram showing line segments, which correspond to colors connecting grid points representing the same color between the color gamut side where the O area is expanded and the color gamut side where the V area is expanded in the color gamut shown in FIG. 19, with thick lines.

FIG. 20 is a diagram showing line segments, which correspond to colors connecting grid points representing the same color between the color gamut side where the O area is expanded and the color gamut side where the V area is expanded in the color gamut shown in FIG. 19, with thick lines.

At the vertices of the thick line, M (magenta), M+P(O), M+P(O)+K, M+K, M+P(V)+K, and M+P(V) are positioned clockwise from the position at 12 o'clock.

Figure 21:
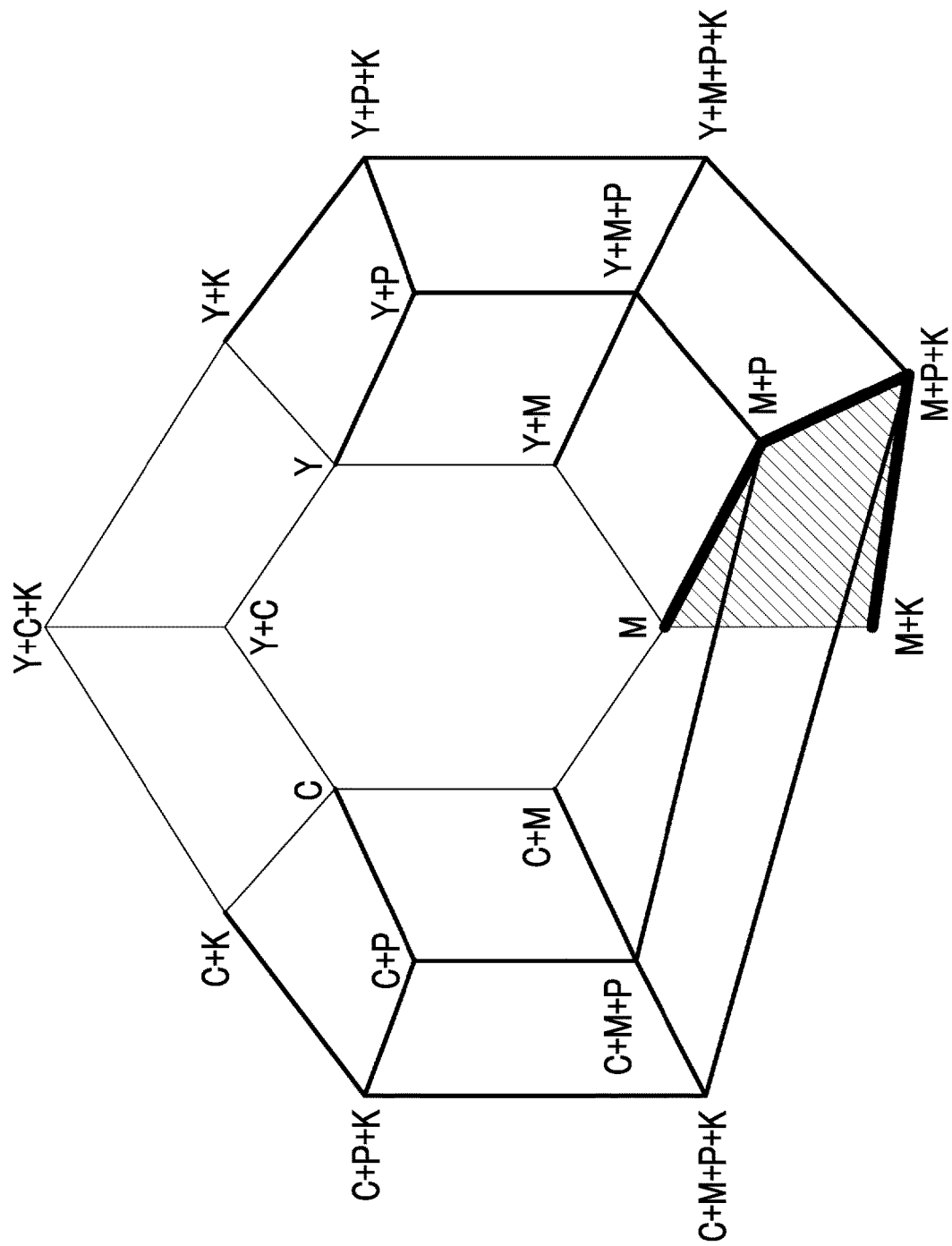
FIG. 21 is a diagram illustrating a state in which an overlapping portion of the color gamut shown in FIG. 20 is folded to one side.

FIG. 21 is a diagram illustrating a state in which the overlapping portion of the color gamut shown in FIG. 20 is folded to one side.

Specifically, in FIG. 21, a face on the V area side, which is defined by the four vertices "M", "M+K", "M+P(V)+K", and "M+P(V)" in FIG. 20, is folded into a face on the O area side defined by the four vertices "M", "M+K", "M+P(O)+K", and "M+P(O)".

Figure 22:
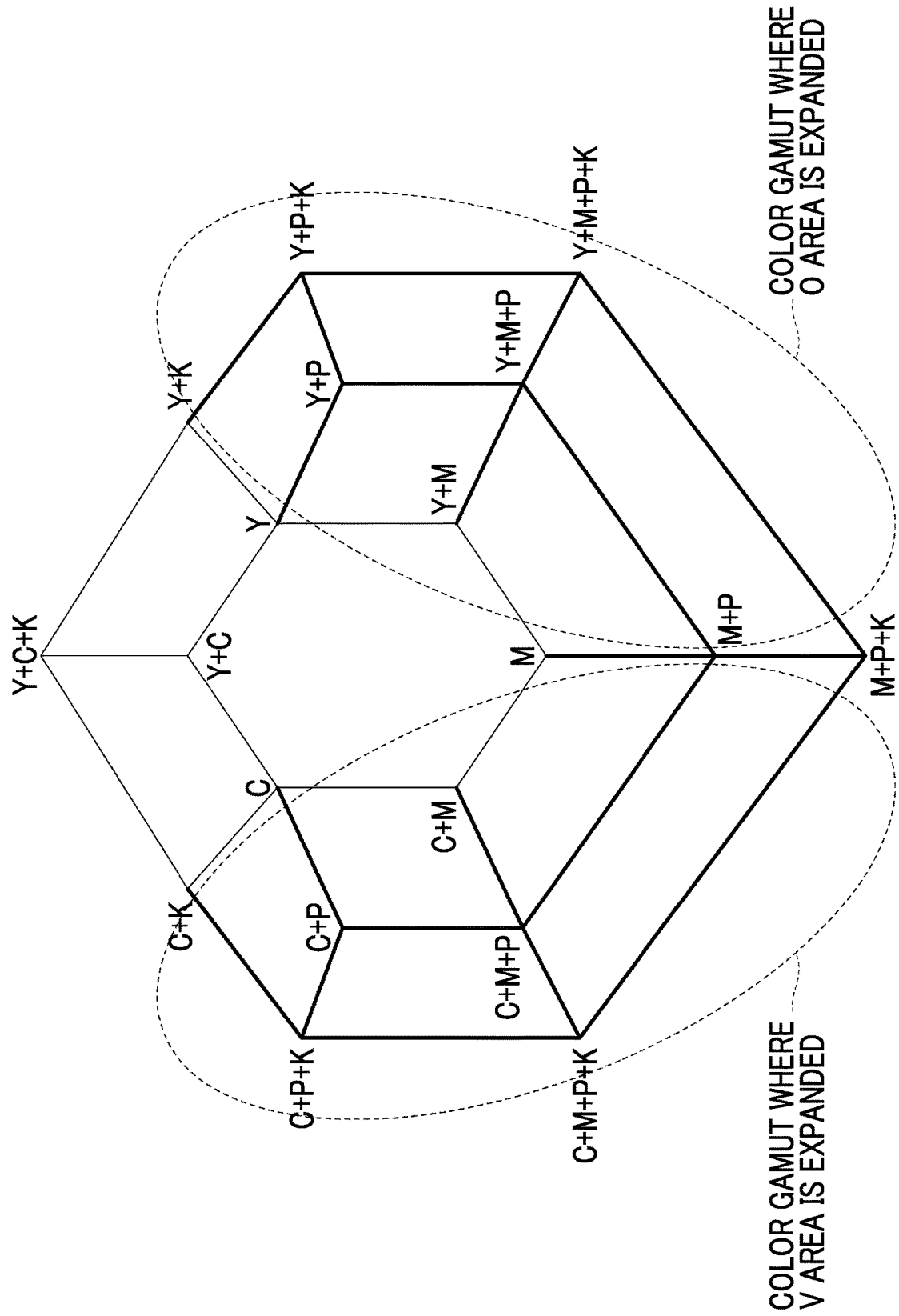
FIG. 22 is a diagram in which a face on an O area side, which is defined by four vertices "M", "M+K", "M+P(O)+K", and "M+P(O)", is removed from the color gamut shown in FIG. 21.

FIG. 22 is a diagram in which a face on the O area side, which is defined by the four vertices "M", "M+K", "M+P(O)+K", and "M+P(O)", is removed from the color gamut shown in FIG. 21.

FIG. 22 shows two expanded color gamuts in which the overlap between the color gamuts has been addressed, surrounded by broken lines. The right side is the color gamut where the O area is expanded, and the left side is the color gamut where the V area is expanded.

Color Separation

Figure 23:
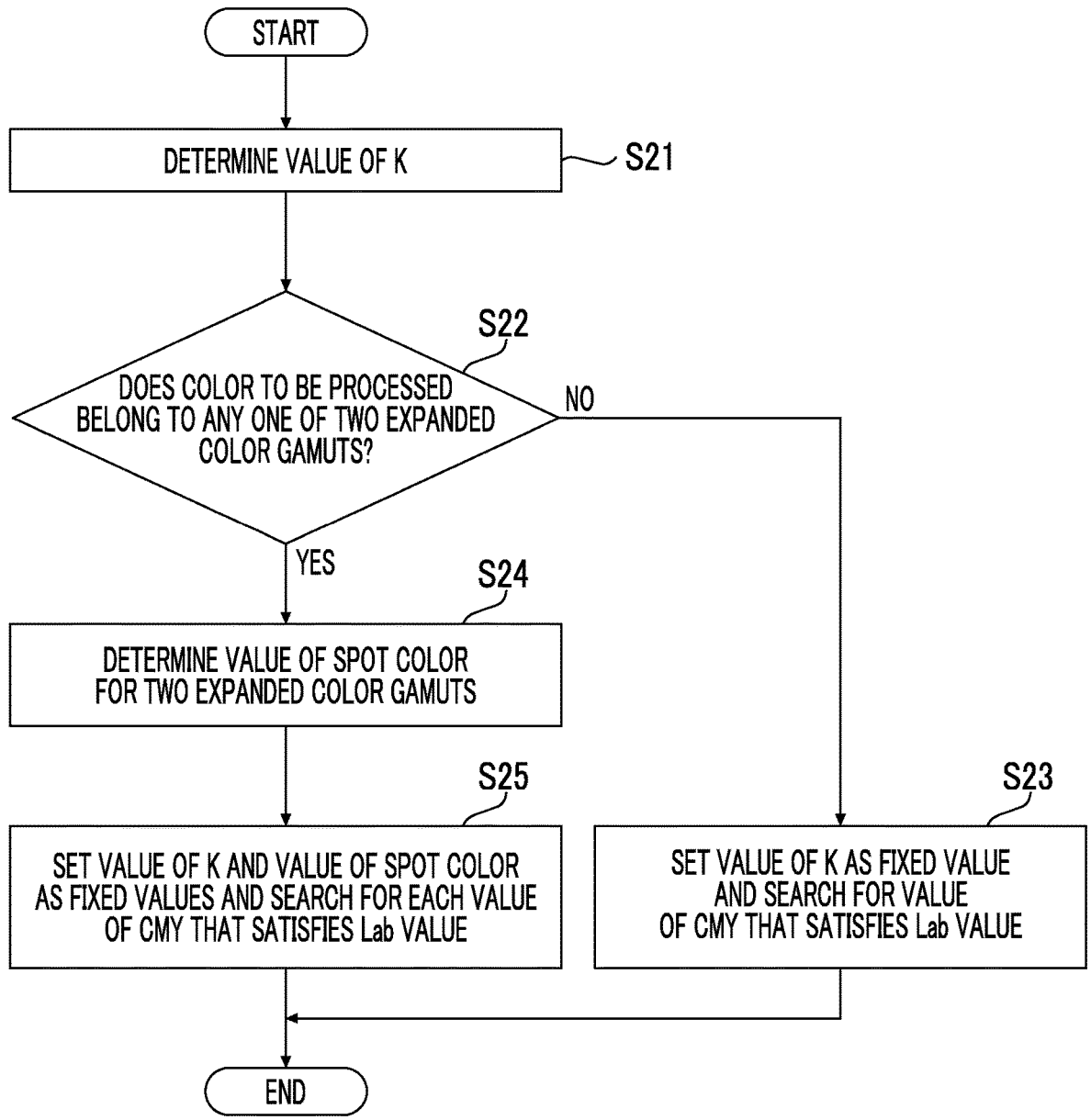
FIG. 23 is a flowchart illustrating an example of a processing procedure executed by a color separation unit.

FIG. 23 is a flowchart illustrating an example of a processing procedure executed by the color separation unit 422C (see FIG. 15).

The processing procedure shown in FIG. 23 is implemented through the execution of a program by the processor 41 (see FIG. 2). The symbol "S" represents a step in the figure.

The processing shown in FIG. 23 is executed for each color designated as a target of the processing, that is, for each color of a specific coordinate point.

First, the processor 41 determines a value of K (step S21.)

Next, the processor 41 determines whether or not the color to be processed belongs to any one of the two expanded color gamuts (step S22). For example, the processor 41 determines whether or not the color to be processed belongs to any one of the O area and the V area after the expansion described with reference to FIG. 22.

In a case where a negative result is obtained in step S22, the processor 41 sets the value of K as a fixed value and searches for each value of CMY that satisfies a Lab value (step S23).

On the other hand, in a case where a positive result is obtained in step S22, the processor 41 determines a value of the spot color for the two expanded color gamuts (step S24). For example, in the case of the color belonging to the O area, a value of the fluorescence P (pink) is determined in the O area surrounded by the broken line in FIG. 22.

Next, the processor 41 sets the value of K and the value of the spot color as the fixed values and searches for each value of CMY that satisfies the Lab value (step S25).

The profile is determined by the above processing.

Summary

As described above, in a case where the control apparatus 40 described in the present exemplary embodiment is used, the expansion of the color gamut that may be reproduced is implemented by the printing apparatus 20 (see FIG. 1) in a case where printing with a spot color toner with a small difference in phase interval from any of the three basic colors except K (black) is possible.

Figure 24:
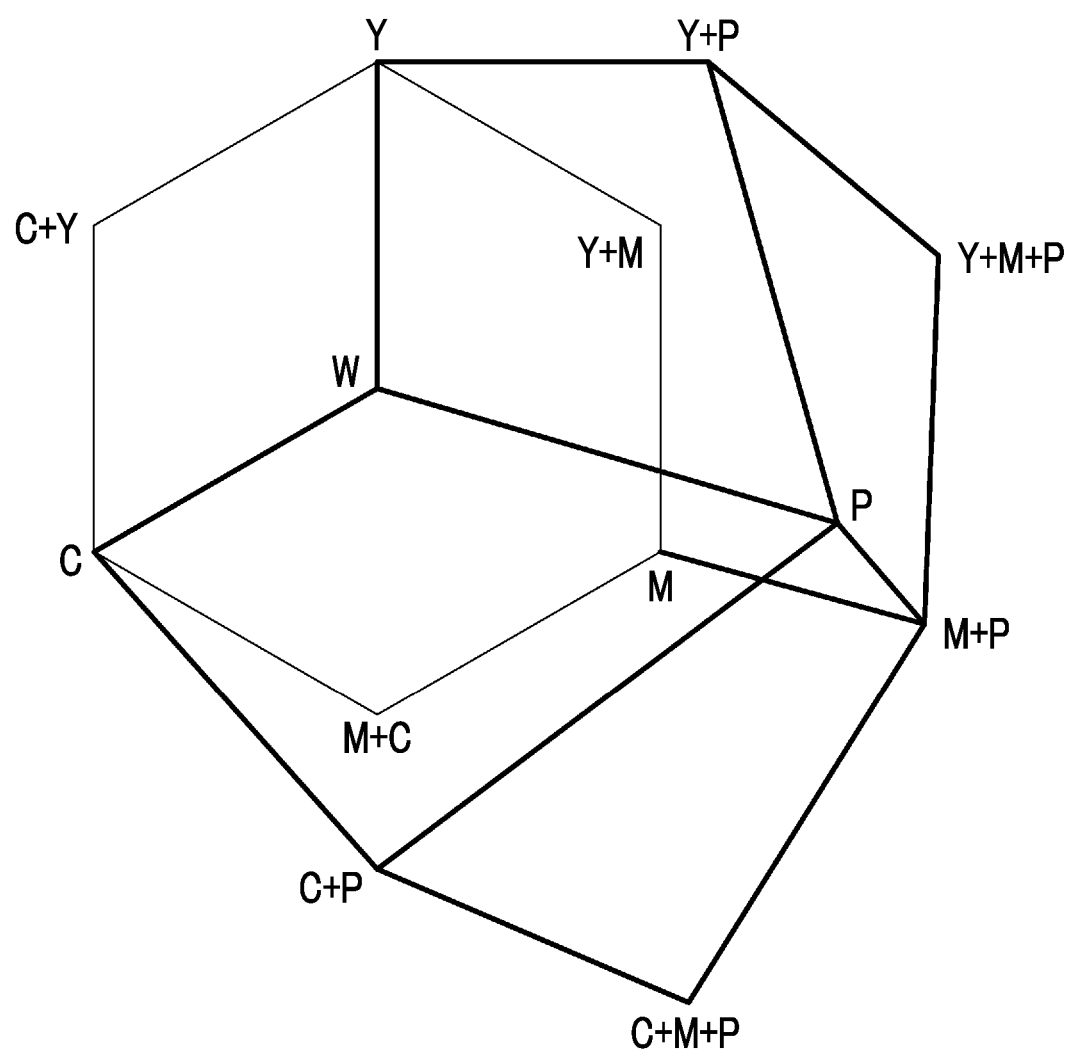
FIG. 24 is a diagram illustrating the expansion of a color gamut according to the present exemplary embodiment.

FIG. 24 is a diagram illustrating the expansion of the color gamut according to the present exemplary embodiment. The color gamut shown in FIG. 24 is wider than the color gamut shown in FIG. 17A or FIG. 17B.

That is, as compared with the method in which only one secondary color gamut is expanded by one spot color toner, bringing out the expressiveness of printing is possible by using the spot color toner.

Other Exemplary Embodiments (1) Although the exemplary embodiment of the present invention has been described above, the technical scope of the exemplary embodiment of the present invention is not limited to the scope described in the exemplary embodiment described above. The fact that the various modifications or improvements to the exemplary embodiment described above are also included in the technical scope of the exemplary embodiment of the present invention, is clearly stated in the claims.

(2) In the exemplary embodiment described above, the generation of a color chart related to the expansion of the color gamut in a case where a fluorescence P (pink) or other fluorescent toner is used by exemplifying the L* a* b* color space has been described, the color space is not limited to the L* a* b* color space.

(3) In the exemplary embodiment described above, the fluorescent color is exemplified as the spot color having a small difference in color space from any of the basic colors except K (black), but the spot color is not necessary to be limited to the fluorescent color. Further, even in a case where the spot color is defined as the fluorescent color, the fluorescent color is not limited to the three colors described above, that is, fluorescence P, fluorescence Y, and fluorescence C.

(4) In the exemplary embodiment described above, the value of the spot color is determined in step S24 (see FIG. 23), but a value of a neutral color between a color of the color material, which has a small difference in the color space from the spot color, and a color of another color material is determined, and a value of a color of the remaining color material is determined, and then the value of the neutral color may be determined as the value of the spot color. For example, in a case where M (magenta) is defined as the color of the first color material and Y (yellow) is defined as the color of the second color material, O (orange), which is the neutral color between the two color materials, is an example of a first neutral color. Further, in a case where M (magenta) is defined as the color of the first color material and C (cyan) is defined as the color of the third color material, V (violet), which is the neutral color between the two color materials, is an example of a second neutral color. In the case of the calculation method, the neutral color is a color represented by the basic color. Therefore, the number of parameters is substantially four, and the calculation load can be reduced.

(5) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to:
        in a case where a first color material, a second color material, a third color material, and a fourth color material in which a difference between the first color material and the fourth color material in a color space is less than a threshold value, are capable of being used, output combinations of values of color materials reproducing a first color, which is used for expanding a color gamut of a secondary color of the first color material and the second color material, and a second color, which is used for expanding a color gamut of a secondary color of the first color material and the third color material.

2. The information processing apparatus according to claim 1, wherein the processor is configured to:
    output a combination of values of the first color material, the second color material, and the fourth color material for the first color, and
    output a combination of values of the first color material, the third color material, and the fourth color material for the second color.

3. The information processing apparatus according to claim 2,
    wherein a color gamut of the first color and a color gamut of the second color are defined as connected color gamuts that do not overlap with each other.

4. The information processing apparatus according to claim 1, wherein the processor is configured to:
    determine a value of the fourth color material reproducing the first color or the second color and then determine a combination of a value of the first color material, a value of the second color material, and a value of the third color material.

5. The information processing apparatus according to claim 4, wherein the processor is configured to:
    in a case where a combination of the color materials reproducing the first color is output,
    first, determine a value of a first neutral color between a color of the first color material and a color of the second color material,
    second, define the value of the first neutral color as a fixed value and determine a combination of the value of the first color material and the value of the second color material, and
    last, determine the value of the first neutral color to the value of the fourth color material.

6. The information processing apparatus according to claim 4, wherein the processor is configured to:
    in a case where a combination of the color materials reproducing the second color is output,
    first, determine a value of a second neutral color between a color of the first color material and a color of the third color material,
    second, define the value of the second neutral color as a fixed value and determine a combination of the value of the first color material and the value of the third color material, and
    last, determine the value of the second neutral color to the value of the fourth color material.

7. The information processing apparatus according to claim 1,
    wherein the first color material, the second color material, and the third color material correspond to basic colors excluding black, and
    the fourth color material corresponds to a fluorescent color.

8. An image forming apparatus comprising:
    a formation unit that forms an image on a medium by using a plurality of color materials; and
    a processor configured to:
        in a case where a first color material, a second color material, a third color material, and a fourth color material in which a difference between the first color material and the fourth color material in a color space is less than a threshold value, are capable of being used in the formation unit, output combinations of values of color materials reproducing a first color, which is used for expanding a color gamut of a secondary color of the first color material and the second color material, and a second color, which is used for expanding a color gamut of a secondary color of the first color material and the third color material.

9. An image forming system comprising:
    the image forming apparatus according to claim 8 that forms an image on a medium by using at least a first color material, a second color material, a third color material, and a fourth color material; and
    the information processing apparatus according to claim 1.

10. An image forming system comprising:
    the image forming apparatus according to claim 8 that forms an image on a medium by using at least a first color material, a second color material, a third color material, and a fourth color material; and
    the information processing apparatus according to claim 2.

11. An image forming system comprising:
    the image forming apparatus according to claim 8 that forms an image on a medium by using at least a first color material, a second color material, a third color material, and a fourth color material; and
    the information processing apparatus according to claim 3.

12. An image forming system comprising:
    the image forming apparatus according to claim 8 that forms an image on a medium by using at least a first color material, a second color material, a third color material, and a fourth color material; and
    the information processing apparatus according to claim 4.

13. An image forming system comprising:
    the image forming apparatus according to claim 8 that forms an image on a medium by using at least a first color material, a second color material, a third color material, and a fourth color material; and the information processing apparatus according to claim 5.

14. An image forming system comprising:

the image forming apparatus according to claim 8 that forms an image on a medium by using at least a first color material, a second color material, a third color material, and a fourth color material; and the information processing apparatus according to claim 6.

15. An information processing apparatus comprising:

a processor configured to:

in a case where a first color material, a second color material, a third color material, and a fourth color material in which a difference between the first color material and the fourth color material in a color space is less than a threshold value, are capable of being used, generate a first color chart in which colors that are reproduced by a combination of a color of the first color material, a color of the second color material, and a color of the third color material are arranged, a second color chart in which colors that are reproduced by a combination of the color of the first color material, the color of the second color material, and a color of the fourth color material are arranged, and a third color chart in which colors that are reproduced by a combination of the color of the first color material, the color of the third color material, and the color of the fourth color material are arranged.

* * * * *